(12) United States Patent
Sato et al.

(10) Patent No.: US 10,805,698 B2
(45) Date of Patent: Oct. 13, 2020

(54) OPTICAL CROSS-CONNECT DEVICE

(71) Applicant: National University Corporation Tokai National Higher Education and Research System, Aichi (JP)

(72) Inventors: Ken-ichi Sato, Nagoya (JP); Hiroshi Hasegawa, Nagoya (JP); Yojiro Mori, Nagoya (JP); Kosuke Sato, Nagoya (JP)

(73) Assignee: National University Corporation Tokai National Higher Education and Research System, Aichi (JP)

(*) Notice: Subject to any disclaimer, the term of this patent is extended or adjusted under 35 U.S.C. 154(b) by 67 days.

(21) Appl. No.: 16/083,457

(22) PCT Filed: Mar. 8, 2017

(86) PCT No.: PCT/JP2017/009333
§ 371 (c)(1),
(2) Date: Sep. 7, 2018

(87) PCT Pub. No.: WO2017/155001
PCT Pub. Date: Sep. 14, 2017

(65) Prior Publication Data
US 2019/0075379 A1  Mar. 7, 2019

(30) Foreign Application Priority Data
Mar. 8, 2016 (JP) .................. 2016-044823

(51) Int. Cl.
*H04Q 11/00* (2006.01)
*H04B 10/27* (2013.01)
*H04J 14/02* (2006.01)

(52) U.S. Cl.
CPC ......... *H04Q 11/0005* (2013.01); *H04B 10/27* (2013.01); *H04J 14/0209* (2013.01);
(Continued)

(58) Field of Classification Search
CPC .............. H04Q 11/0005; H04J 14/0209; H04J 14/0212; H04J 14/0217
See application file for complete search history.

(56) References Cited

U.S. PATENT DOCUMENTS 5,805,320 A * 9/1998 Kuroyanagi ........ H04J 14/0295
                                                           398/5
6,339,488 B1 * 1/2002 Beshai ................ H04J 14/0227
                                                           370/406
(Continued)

FOREIGN PATENT DOCUMENTS

JP  2006-191212 A  7/2006
WO  2015/005170 A1  1/2015

OTHER PUBLICATIONS

Yasuhiro Tanaka et al., "Criteria for Selecting Subsystem Configuration in Creating Large-Scale OXCs", Optical Society of America, vol. 7, No. 10, Oct. 2015, pp. 1009-1017.
Notification of Transmittal of Translation of the International Preliminary Report on Patentability (Chaper II); PCT/JP2017/009333; dated Sep. 13, 2018.

*Primary Examiner* — Charlie Y Peng
(74) *Attorney, Agent, or Firm* — Studebaker & Brackett PC

(57) ABSTRACT

In the case of a OXC device having a route & select-type configuration of the conventional technique, when the port number is 20, then the entire device requires 120 WSSs having a 1×9 configuration. In the case of a route & select-type OXC device having ports more than 20 ports, a large amount of expensive WSSs is required. Thus, such a device is impractical from the viewpoint of cost. Thus, the expansion depending on an increase of traffic at nodes was impossible, flexible scalability could not be provided, and a reasonable network operation from the viewpoint of economy was difficult. According to the OXC device of this disclosure, regardless of the input port number and the output port number of the device, WSSs having a smaller
(Continued)

scale than the conventional technique are used and the WSSs are internally-connected from a viewpoint different from that of the conventional technique, thus providing the device having a significantly-reduced cost.

34 Claims, 32 Drawing Sheets

(52) U.S. Cl.
CPC ...... *H04J 14/0212* (2013.01); *H04J 14/0217* (2013.01); *H04Q 11/0003* (2013.01); *H04Q 2011/0016* (2013.01)

(56) References Cited

U.S. PATENT DOCUMENTS

| | | | | |
|---|---|---|---|---|
| 7,209,454 | B2* | 4/2007 | Beshai | H04Q 11/0005 370/254 |
| 7,676,155 | B2* | 3/2010 | Cho | H04J 14/0227 398/57 |
| 7,720,330 | B2* | 5/2010 | Bortolini | G02B 6/29307 385/17 |
| 9,084,033 | B2 | 7/2015 | Sato et al. | |
| 9,325,604 | B2* | 4/2016 | Li | H04L 45/02 |
| 2002/0030867 | A1* | 3/2002 | Iannone | H04J 14/0295 398/49 |
| 2006/0140625 | A1 | 6/2006 | Ooi et al. | |
| 2016/0150300 | A1 | 5/2016 | Sato et al. | |

\* cited by examiner

OPTICAL CROSS-CONNECT DEVICE

TECHNICAL FIELD

The present invention relates to an optical cross-connect device used at a node of an optical communication network.

BACKGROUND ART

Through the optical communication technique using optical fibers as a transmission medium, a longer signal transmission distance and a large optical communication network have been achieved. In recent years, the Internet communication has been widely provided via ADSL (Asymmetric Digital Subscriber Line) or FTTH (Fiber To The Home) line, resulting in the current situation where commoditized mobile wireless terminals are used via a wireless communication line. In accordance with this, the wired network and the wireless network both have an explosively-increased communication traffic, resulting in greater demands for a communication network providing a higher capacity, a higher speed, a higher function, and a lower power consumption. Recently, the flat rate music services and distribution services of high definition dynamic images using streaming have been increasingly used. Thus, the IP traffic in the world is expected to increase at an annual rate of 130%.

An optical communication can be configured so that the wavelength multiplexing communication technique is used to simultaneously transmit a plurality of optical signals having different wavelengths through one optical fiber transmission path to thereby increase the transmission capacity between two points. Furthermore, a node at which a plurality of transmission paths are collected in a communication network uses a method of directly setting or switching, without converting an optical signal to an electric signal, a signal path while directly using the optical signal, realizing the so-called photonic network. The use of the photonic network is expected to dramatically increase the throughput of the node and to dramatically reduce the power consumption of a node device.

Well-known optical node systems using a photonic network include a reconfigurable optical add/drop multiplexing (ROADM: Reconfigurable Optical Add Drop Multiplexing) system in which a plurality of nodes are connected in a ring-like or bus-like manner and an optical cross-connect (OXC: Optical Cross-Connect) system in which a plurality of nodes are connected in a mesh-like manner. The OXC system is configured so that the respective nodes are connected to a plurality of input-side optical fiber transmission paths and a plurality of output-side optical fiber transmission paths. The input-side optical fiber transmission paths send wavelength division multiplexing optical signals (hereinafter referred to as wavelength multiplexed light) to an optical switch that switches connection paths (routes) for the respective wavelengths. This configuration can be used to output, to an arbitrary output-side optical fiber transmission path, an optical signal having an arbitrary wavelength of the wavelength multiplexed light sent from an arbitrary input-side optical fiber transmission path.

FIG. 1 shows the outline of the traffic path switching of optical nodes in the OXC system. An optical network having the OXC system is configured so that a node 1 is connected to a plurality of adjacent nodes in a mesh-like manner. A plurality of optical fibers 10 connected from other adjacent nodes are inputted to the node 1. After specific traffic is subjected to a path switching in the node 1, the traffic is then transferred to other nodes via one of a plurality of optical fibers 11. Specifically, one input optical fibers 10-1 is configured so that wavelength multiplexed light 12 obtained by multiplexing the optical signals of a plurality of wavelength of $\lambda_1$ to $\lambda_x$ are transmitted therein from one node of a plurality of adjacent nodes. In the node 1, an optical signal having one arbitrary wavelength of the wavelength multiplexed light 12 (e.g., an optical signal 14-1 having a wavelength $\lambda k$) is selected. The selected optical signal is transmitted to as an optical signal 14-2 having a wavelength $\lambda k$ of a wavelength multiplexed light 13 transmitted through one arbitrary output optical fiber of a plurality of output optical fibers 11 (e.g., output optical fiber 11-$n$). Thus, the node 1 operates so that an optical signal having an arbitrary wavelength inputted to m input ports connected to m input optical fibers is switched to an arbitrary output port connected to n output optical fibers. As described above, such a node that has the m input ports and the n output ports and that has each port connected to optical fibers to transmit wavelength multiplexed light and that directly subjects an optical signal having a specific wavelength to an arbitrary path switching is called as an optical cross-connect (OXC: Optical Cross-Connect) device. This node also may be called a ROADM but will be called as an OXC device in the following description of this specification (Patent Publication 1).

FIG. 2A and FIG. 2B are a concept diagram of two configuration examples of the OXC device. FIG. 2A illustrates the configuration of a broadcast & select-type OXC device 20-1 in which the m input ports are connected to m optical fibers and the n output ports are connected to n optical fibers. The input side has m optical couplers 21 having a 1×n configuration and the respective optical couplers operate to branch inputted wavelength multiplexed light to n pieces. The optical couplers 21 simply operates to branch light at a generally-equal level, thus causing a lower optical signal level after branching. The output side has n wavelength selective switches (WSS: Wavelength Selective Switches) 22 having an m×1 configuration and the respective WSSs can operate to select an arbitrary combination of optical signals having arbitrary wavelengths from wavelength multiplexed light included in the respective wavelength multiplexed lights included in the branched lights from the respective m optical couplers.

The WSS is configured so that the simultaneous reception of optical signals having the same wavelength from different wavelength multiplexed lights prevents the output side from being able to distinguish these optical signals, thus resulting in the selection of optical signals having different wavelengths from different wavelength multiplexed lights. The WSS can select an optical signal with a wavelength selectivity and can use a combination of an arrayed waveguide diffraction grating (AWG) and an optical switch for example or the AWG may be substituted with other bulk-like diffraction gratings for example. The OXC device 20-1 having the configuration of FIG. 2A uses the optical coupler 21 to distribute (or branche) the wavelength multiplexed light after which the WSS 22 is used to select an optical signal having an arbitrary wavelength. Thus, the OXC device 20-1 is called as the broadcast & select-type one.

FIG. 2B illustrates the configuration of a route & combine-type OXC device 20-2 that is obtained by inverting the optical signal direction of the broadcast & select-type configuration. Specifically, the input side has m WSSs 23 having a 1×n configuration while the output side has n optical couplers 24 having an m×1 configuration. Thus, the only difference between the route & combine-type OXC device 20-2 and the broadcast & select-type one is an order of selecting wavelengths and the configurations of FIG. 2A and FIG. 2B are common in that an optical signal having an arbitrary wavelength of the wavelength multiplexed light inputted to an arbitrary port is outputted to an arbitrary output port. Generally, the number m of the input ports of the OXC device may be different from or the same as the number n of the output ports.

As described above, the optical couplers 21 and 24 have an insertion loss increasing depending on the ramification number. Specifically, when assuming that the ramification number is n, the loss (dB) occurs at 10 log(n). Thus, when the ramification number reaches 20, the loss increases to 13 dB for example. On the other hand, a WSS having a 1 input and L output (1×L) configuration can have a smaller loss than in the case of an optical coupler having the same ramification number (e.g., a loss of about 7 dB at most in the case of the output port number is 20). An increased number of ports in an OXC device causes an increased loss in the optical couplers 21 and 24, thus causing, in both of the configurations of FIG. 2A and FIG. 2B, a decreased level of optical signals, which consequently requires the introduction of a light amplifier for example. In order to avoid the disadvantage of the loss due to the optical coupler, an OXC device configured only by WSS without using an optical coupler has been regarded promising as an optical switch for a large node.

FIG. 3 illustrates the configuration of a route & select-type OXC device. As in the respective configurations shown in FIG. 2A and FIG. 2B, the m input ports are connected to the m optical fibers while the n output ports are connected to the n optical fibers. The OXC device having this configuration, which is also called as the route & select-type one, uses the WSS only without the use of an optical coupler to perform a path switching. Thus, this configuration is a combination of the broadcast & select-type one and the route & combine-type one described in FIG. 2A and FIG. 2B. When the configuration of FIG. 3 is compared with the respective configurations of FIG. 2A and FIG. 2B, the increase of the insertion loss can be suppressed, even when an increase of the number of the input ports and output ports of the OXC device is caused. Thus, this route & select-type OXC device is generally used when the port number is about 8 or more.

FIG. 4A and FIG. 4B illustrate how the OXC device operates in an actual network. FIG. 4A shows the geographic layout of an optical network in which a plurality of nodes shown by rectangle marks are mutually connected in a mesh-like manner. For example, one rectangle corresponds to one city and a plurality of cities (nodes) are connected by a transmission path link for optical fibers. A node 40 shown by the outlined rectangle is shown so that the node 40 as a center is surrounded by six adjacent nodes shown by circles of dotted lines directly connected to the node 40. A certain node is directly connected to adjacent nodes via a transmission link. The number of such adjacent nodes is called as a node degree (Node Degree). Thus, the node degree is 6 in the case of the node layout of FIG. 4A. The respective nodes connected in a mesh-like manner have OXC devices to process the traffic between the nodes and adjacent nodes.

FIG. 4B illustrates the configuration of an OXC device 41 provided at the center node 40. The OXC device 41 is the route & select-type configuration in which the input port side and the output port side both have WSSs. In the case of the network layout of FIG. 4A, when seeing from the perspective of the center node 40, 60 adjacent nodes are connected to the center node 40. Thus, when the respective nodes are connected by a pair of connection fibers (UP connection fibers and DOWN connection fibers), then the number m of the input optical fibers and the output optical fibers is 6, respectively. Thus, the OXC device 41 in the drawing, has the first to sixth input optical fibers and the first to sixth input ports and the first to sixth output optical fibers and the first to sixth output port in an order from the top. The first input optical fiber and the first output optical fiber are connected to the first node among the 6 adjacent nodes. Similarly, the input optical fiber and output optical fiber having the same number are connected to adjacent nodes having the corresponding number. It is noted that the OXC device 41 is configured so that an input optical fiber and an output optical fiber connected to one adjacent node generally do not have to be connected. The connection between the input-side WSS and the output-side WSS does not generally require the internal connection shown by the dotted line 44 for connecting an input port and an output port having the same number. The reason is that there is no meaning in routing optical signals in the same node and thus no path is required to perform such a switching. Specifically, an optical signal from one of adjacent nodes may be path-switched to the remaining 5 adjacent nodes other than the one adjacent node via the center node 40. Thus, the input side and the output side may have the respective WSSs having the port number $N_{WSS}$ of (m−1)=5.

As shown in FIG. 4B, the center node at which the OXC device is provided and one adjacent node have therebetween a pair of two fibers of an input (UP) optical fiber and an output (DOWN) optical fiber. Thus, the OXC device is expanded by an increase of the traffic amount passing through the node with time. Thus, when an optical fiber is added as a new additional optical fiber link, a pair of an UP link-exclusive optical fibers and a DOWN link-exclusive optical fibers is generally added. The reason is that a wide area network generally does not require one optical fiber used for the bidirectional communication. In the respective configuration example of FIG. 2A, FIG. 2B, and FIG. 3, the input port number m and the output port number n were described as being different. However, the OXC device generally has the same number of input ports and the same number of output port. When the UP and DOWN traffic amounts are different extremely, one transmission path link may have optical fibers in a different number depending on the UP link and the DOWN link but generally m=n may be established.

As described at the beginning, an increase of the traffic between optical nodes causes an increase of the amount of traffic handled by the OXC device, which causes an increase of the number of optical fibers on one transmission path link. Thus, an increase of the number of optical fibers means an increase of the number of ports of the OXC device required to connect optical fibers.

CITATION LIST

Patent Literature

PTL 1: The specification of U.S. Pat. No. 9,084,033

SUMMARY OF INVENTION

Technical Problem

However, the OXC device has a significant disadvantage in technique and cost in order to increase input and output ports. In the case of the OXC device having the broadcast & select-type configuration shown in FIG. 2A or the route & combine-type configuration shown in FIG. 2B, an insertion loss is caused when light is branched at an optical coupler. When the OXC device has an increased number of ports, the optical coupler also has an increased ramification number, which causes this loss to increase at a non-negligible level. When the number of ports is within a range up to about 8 for example, the insertion loss is small as 9 dB. When the number of ports increases to 64 however, the loss exceeds 20 dB due to other factors in addition to branching. When the traffic is expected to increase at an annual rate of about 23%, this means that the traffic amount required in 10 years will be $1.23^{10}=8$ times higher from now. Thus, even when an optical coupler of an OXC device having a 8×8 configuration designed in consideration of the current traffic amount causes a loss within a permissible range, this OXC device cannot be used without using a loss compensation when using a 64×64 configuration designed to satisfy the traffic amount in 10 years. Thus, regarding an OXC device having an increased number of input and output ports, the route & select-type OXC device having a large configuration using not an optical coupler but a WSS only has been considered promising.

FIG. 5A and FIG. 5B illustrate the configuration of an OXC device obtained by increasing the number of input and output ports of the prior art. FIG. 5A illustrates an example of the broadcast & select-type configuration obtained by directly using the configuration of FIG. 2A and by increasing the port number N to 20 or more. As described above, when this configuration is used to branch signal light to 20 pieces, then the insertion loss due to the input-side signal optical coupler (SC) is 13 dB. If other excessive losses are considered, a decrease of the optical signal level of 15 dB is caused by merely passing through the optical coupler of the OXC device. FIG. 5B shows an example of the route & select-type configuration using WSS only in which the port number N is increased to 20 or more. When this configuration is compared with the configuration of FIG. 5A using the optical coupler, this configuration can improve the insertion loss by 7 dB or more. In the case of the route & select-type OXC device of FIG. 5B having a configuration having 20 input and output ports, the input-side WSS 53 and the output-side WSS 54 both require the WSS having a 1×20 configuration. For simplicity, when assuming that a plurality of (or n) ports of the WSS having a 1×n configuration are/is used as an output port regardless of the optical signal direction, then a path is configured that extends from one WSS connected to the ports of one side of the OXC device to the port to the output port of all WSSs of the ports at the opposite side. Specifically, the output port of one input-side WSS 53 is connected to the respective output ports of all output-side WSSs 54 of the opposite side and the output port of one output-side WSS 54 is connected to the respective output ports of all input-side WSSs 53 of the opposite side. This configuration also can omit, as described above, the connection between input optical fibers and output optical fibers connected to the same adjacent node. However, this omission is not considered for simplicity in the following description. The mutual connection between WSSs of both sides allows all paths between nodes connected to the OXC device to be set, thus realizing a routing having no contention if the same wavelength is prevented from being routed to one output port. The route & select-type configuration of FIG. 5B having the mutual connection as described above can suppress the increase of the insertion loss but still is disadvantageous in technique and cost in order to provide a large-sized OXC device.

FIG. 6A to FIG. 6C illustrate the WSS configuration example and the cross-talk issue. FIG. 6A and FIG. 6B show specific WSS configuration examples. The WSS 60-1 shown in FIG. 6A includes fiber arrays through which light is inputted and outputted and includes bulk-type optical components such as an LCOS optical processor 62, a cylindrical lens 63, and a grating 61. Any of the optical components is relatively expensive. These components must be accurately assembled and adjusted manually, thus limiting the number of achieved output ports. The WSS 60-2 shown in FIG. 6B includes an analog micro-mirror array (MEMS) 64, a lens, and a grating 65 for example and is configured so that light is inputted and outputted via a collimetor array 66. The configuration of the WSS 60-2 also require expensive optical components and mechanical components to be accurately assembled and adjusted. Thus, the currently-available components constituting the WSS and the WSS require the manufacture cost 10 times higher than that of an optical coupler configurable by a PLC (Planar Lightwave Circuit). Furthermore, in the case of the above route & select-type configuration shown in FIG. 5B in which the input and output sides both have WSSs only, the number of WSSs relatively expensive than the configuration of FIG. 5A is 2 times higher. The number of the currently available WSS output ports is limited to about 9 at maximum. This is due to a cross talk issue as described below that is caused when the WSS has many ports.

FIG. 6C illustrates the cross talk caused in the WSS. Various types of cross talks occur in the WSS. However, the wavelength selective property of the WSS is most influenced by an inbound cross talk. The inbound cross talk is shown by the arrow of the dotted line of FIG. 6C. The inbound cross talk means a leaked optical signal (leaked undesired signal) having the same wavelength km propagating from a nonselective input optical fibers 68-7 when an optical signal (undesired signal) having the same wavelength km including the wavelength multiplexed light from one input optical fiber 68-1 is selected by an output optical fiber (port) 69. The leaked optical signal (leaked undesired signal) having the same wavelength $\lambda_m$ from the nonselective input optical fibers 68-7 inevitably interfere with a target optical signal (desired signal) from the input optical fibers 68-1, which deteriorates the signal quality. Furthermore, optical signals having other wavelengths not selected by the output optical fibers 69 will leak through all input ports to the output optical fibers 69. This is called as an outbound cross talk, which limits, when combined with the inbound cross talk, the wavelength selectivity of the WSS. Since the filtering is difficult, the above-described cross talk amount generally increases with an increase of the WSS port number. This leads to a lower wavelength selectivity. Thus, the number of the WSS output ports is currently limited to about 9 at maximum. The WSS generally has a 1×n configuration having one input (output) port and n output (input) ports. The port number n at the side of a plurality of ports is called as a WSS degree (WSS Deg). For example, the WSS having a 1×20 configuration has a degree of 20.

Thus, the WSS having a 1×20 configuration for example required to realize the OXC device having 20 ports shown in FIG. 5B is configured by, as by the WSS 55 shown in an enlarged view of FIG. 5B, cascade-connecting the WSSs 56-1 to 56-3 having a smaller port number (or having a smaller WSS degree). Specifically, the two parallel WSSs 56-1 and 56-2 having a 1×9 configuration are cascade-connected to another WSS 56-3 having a 1×9 configuration. In this case, the OXC device having the route & select-type configuration shown in FIG. 5B requires 20×3=60 WSSs at both of the input port side and the output port side, thus requiring the total of 120 WSSs having the 1×9 configuration for the entire device. When the route & select-type configuration shown in FIG. 5B is compared with the broadcast & select-type configuration shown in FIG. 5A, the route & select-type configuration requires at least two times higher number of WSSs, which hinders the feasibility of the OXC device having the route & select-type configuration having more than 20 ports from the viewpoint of the cost.

Furthermore, the OXC device having the route & select-type configuration according to the prior art shown in FIG. 5B provides a poor flexible expansibility to cope with an increase of the traffic amount, which is disadvantageous in providing scalability. As described above, the OXC device 50-2 shown in FIG. 5B is configured so that the configurations of the center node at which the OXC devices are provided and the adjacent nodes thereof as well as the estimated maximum traffic amount expected at the center node during a certain period in order to be able to handle this estimated maximum traffic amount. Specifically, the maximum input port number and output port number of the OXC device are determined depending on the maximum traffic amount of the node to determine the WSS configuration. Furthermore, one WSS at one side (e.g., at the input port side) is mutually connected to all of the WSSs at an opposite side (output port side) so that all path between these input port and output port can be set. The connection using the internal path as described above allows the OXC device 50-2 to have a configuration in which a path to connect arbitrary nodes connected by optical fibers can be set and switched. Increasing the number of optical fibers connected to the OXC device depending on an increase of the traffic at the center node at which the OXC device is provided can always provide a perfect path setting with no contention while preventing the traffic on the optical fibers from exceeding the maximum transmission rate of the optical fibers and preventing wavelength collision.

However, the OXC device 50-2 is generally configured so that all WSSs are already provided and are mutually connected at the start of the operation. In order to subject the device during the operation to an extension work including the connection of an internal path, a complicated work is required and the work may cause an accident, which is unpractical. Thus, at a timing at which the device is introduced, such a WSS having a configuration having the maximum port number satisfying the predicted maximum traffic amount (generally the device port number=WSS degree) must be used that is already configured so that all WSSs are mutually connected. However, a new node generally has, at the start of the operation, such a traffic amount that is naturally smaller than the estimated maximum traffic amount. When considering a recent rapid rate at which the traffic is increasing, at the introduction of the OXC device, a half or more of the WSSs having already-connected internal paths is not yet used. Specifically, in the case of the OXC device of the prior art, the device must be introduced while including many not-yet-used WSSs. In other words, the only option is that, expensive devices within the device, which require an extremely-high initial cost, are inevitably used with a low operating ratio. As described above, in the case of the OXC device having the route & select-type configuration according to the prior art shown in FIG. 5B, the device cannot be introduced with a reasonable initial configuration and cannot be flexibly expanded in accordance with the increase of the traffic at a node, thus failing to provide scalability and a simple and reasonable operation of the network in consideration of the economy.

The present invention has been made in view of the disadvantage as described above. It is an objective of the invention to realize a large-scale OXC device with a lower cost.

Solution to Problem

One aspect of this disclosure discloses an optical cross-connect (OXC) device, comprising: a plurality of input ports connected to a plurality of input optical fibers and a plurality of output ports connected to a plurality of output optical fibers. The OXC device is mutually connected via the plurality of input optical fibers and the plurality of output optical fibers to N adjacent nodes (N is a natural number). A wavelength-multiplexed optical signal inputted to one of the plurality of input ports is wavelength-routed to any of the plurality of output ports. The OXC device comprises, at the side of the plurality of input ports, a plurality of wavelength selective switches (WSSs) having a $1 \times N_{WSS}$ configuration each of which has an input port connected to one of the plurality of input optical fibers and $N_{WSS}$ output ports. When assuming that, for one adjacent node j (j=1, 2 ..., N) of the N adjacent nodes, the number of a fiber pair consisting of one of the input optical fibers connected to the OXC device and one of the output optical fibers is $N_{Pair,j}$ (j=1, 2 ..., N) connected to the OXC device and the total of the number of the fiber pairs between (N−1) adjacent nodes and the OXC device except for the one adjacent node j is $N_{Total,j}$, and the maximum value $N_{Max}$ of the $N_{Total,j}$ satisfies the relation of $N_{Max} > N_{WSS}$ for the respective N adjacent nodes.

Advantageous Effects of Invention

As described above, a large-scale OXC device is realized with a lower cost.

DESCRIPTION OF EMBODIMENTS

Figure 1:
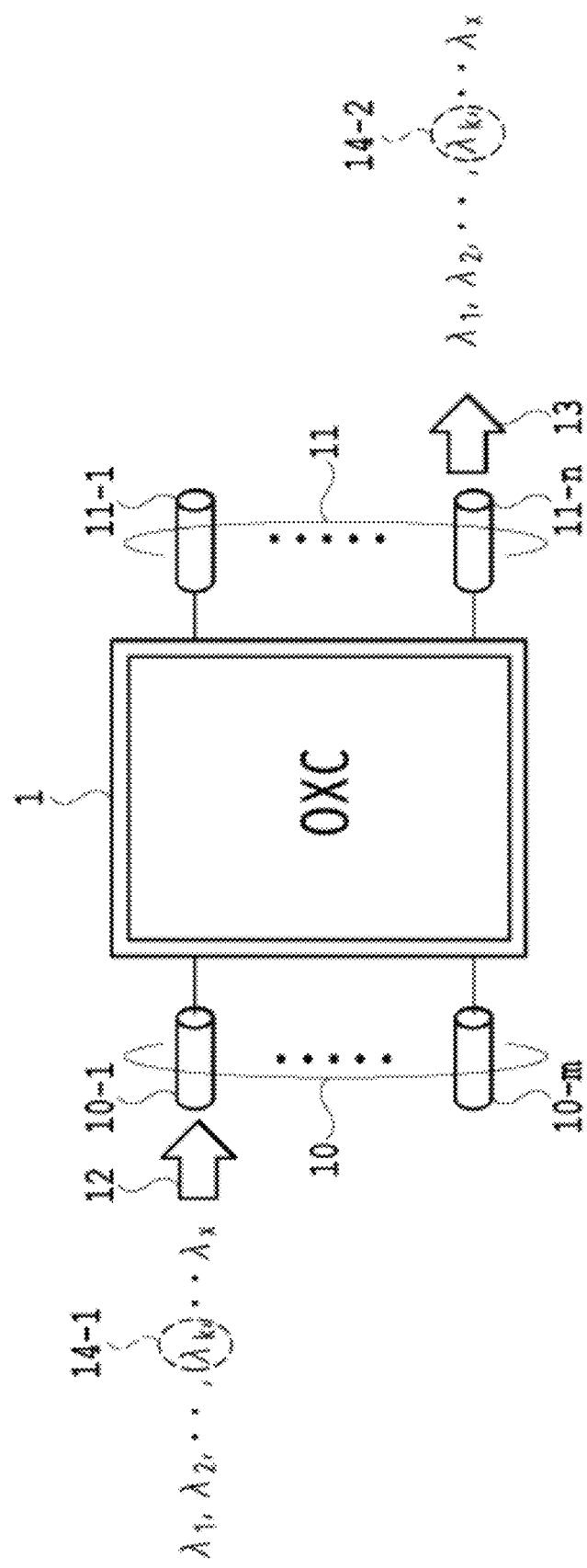
FIG. 1 shows the outline of the traffic switching of optical nodes in an OXC system.

The OXC device of this disclosure realizes a device requiring a significantly-lower cost by using, regardless of the number of input ports and the number of output ports of the device, a smaller-scale WSS compared to the conventional technique and by connecting WSSs in the device from a viewpoint different from that of the configuration based on the conventional technique. Furthermore, the OXC device of this disclosure allows the device to be expanded in a flexible and economical manner depending on the setting of the initial status of the traffic and the subsequent increase of the traffic. Furthermore, the device can be expanded as required in a stepwise manner without limitation. In the case of the OXC device of the prior art, the configurations (or numbers) of the input ports and the output ports of the device were determined only based on the number of optical fibers to correspond to an estimated maximum traffic in the future. Furthermore, the OXC device of the prior art used the maximum configuration in which all output ports opposed to each other in the device were mutually connected so that all paths achievable between the input ports and the output ports can be set. This has resulted in the only option that the maximum port number of the OXC device leads to the selection of the WSS having a large-scale configuration such as a 1×20 configuration The inventors has reached a concept that the internal paths of the OXC device may be connected in consideration not only of the maximum number of optical fibers to be connected to a node at which the OXC device is provided but also of the connection between the individual optical fibers and actual adjacent nodes and the individual traffic amounts. The inventors have found, based on this consideration, that a very small decline of the traffic accumulation rate when compared with the OXC device of the prior art can be achieved without posing a certain limitation on the internal path setting and mutually connecting all output ports of the WSS opposed to each other in a complete manner. In the case of the WSS in the OXC device of the prior art, internal paths therein were connected so as to avoid a lowered routing characteristic, even when these paths are rarely used in consideration of the geographic position of a node to which optical fibers are connected. In the case of the OXC device of the prior art, the maximum configuration was used in which all ports opposed to each other in the WSS of the OXC device are connected to each other. Thus, the inventors have reached a concept that, although this maximum configuration allows all paths to be set securely, this maximum configuration also may cause wasteful paths. The inventors also found that, even when the number of optical fibers is increased in order to satisfy the estimated maximum traffic amount, the actual number of required adjacent nodes is 8 or less at maximum based on the geographic relation of the actually-existing networks. According to this disclosure, even a WSS of a smaller scale can provide a sufficient performance and can handle the traffic without looking too much at the maximum number of optical fibers connected to the center node at which the OXC device is provided.

The following section will describe the configuration of the OXC device of this disclosure with reference to the drawings. In the following description for the OXC device of this disclosure, it is assumed for simplicity that the number of input ports is equal to the number of output ports to provide a symmetric configuration between the input ports and the output ports of the device. However, the feature of this disclosure is directly maintained even when the number of the input ports is different from the number of the output ports as describe later. In the following description, when the terms "input port" and "output port" are use, it is assumed that the terms represent the input port and the output port of the OXC device, respectively.

In this specification, the term "OXC device" is used as being synonymous with an OXC node. The OXC device is configured so that one or more input optical fibers connected to a plurality of adjacent nodes are connected to one or more output optical fibers and functions to wavelength-route an optical signal having a specific wavelength multiplexed light inputted to an arbitrary input port to an arbitrary output port.

Figure 7A:
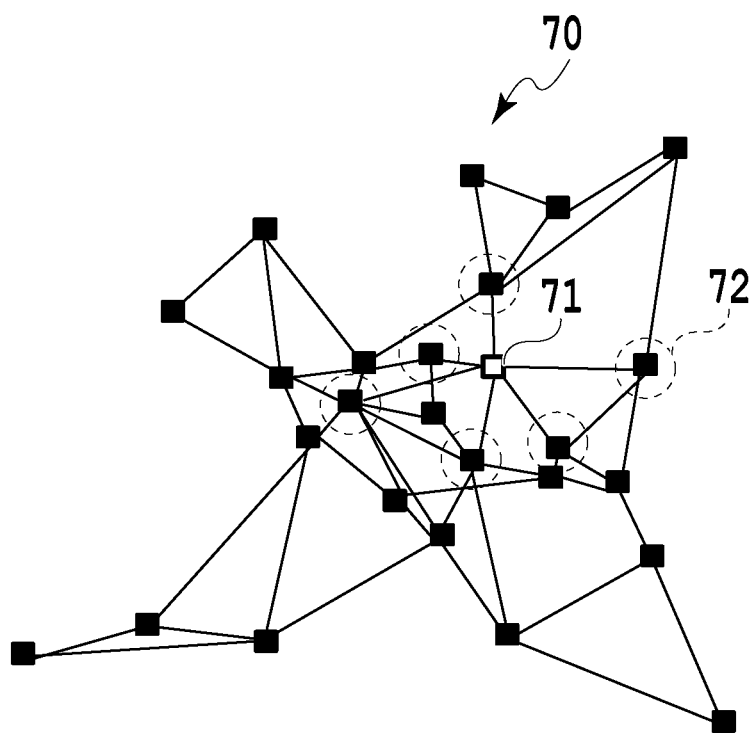
FIG. 7A illustrates the geographic configuration of a network including the center node in which the OXC device of this disclosure is used.
Figure 7B:
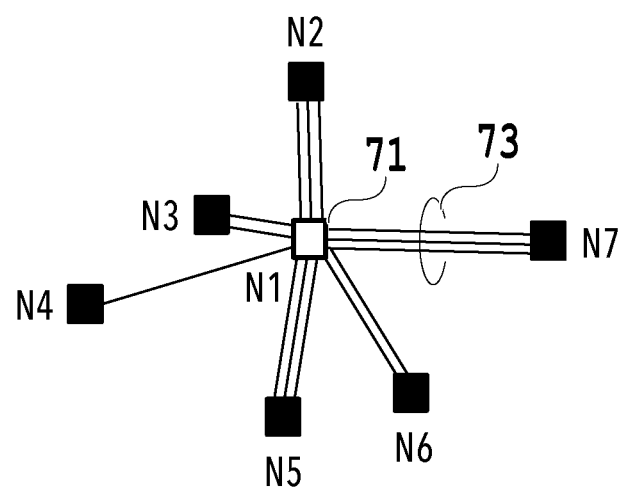
FIG. 7B illustrates the allocation of optical fiber pairs between the center node and adjacent nodes in the network using the OXC device of this disclosure.
Figure 7C:
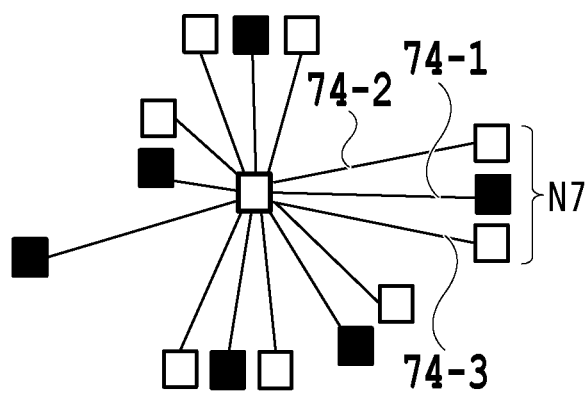
FIG. 7C illustrates the connection status of the optical fibers in consideration of the expansion of the OXC device expansion in the network in which the OXC device of this disclosure is used.

FIG. 7A to FIG. 7C illustrate the configuration of the network in which the OXC device of this disclosure is used. A node at which the OXC device of this disclosure is provided is called as a "center node" in the following description. A network in which the OXC device of this disclosure is provided has a configuration similar to that of the conventional technique. FIG. 7A illustrates the geographic configuration of a network 70 including a center node 71. The center node 71 is surrounded by six adjacent nodes 72 shown by circles of dotted lines. The adjacent nodes 72 have a direct link to the center node. Thus, the center node 71 has a node degree (node Deg) of 6. One transmission path link between nodes shown in FIG. 7A merely shows that the nodes have therebetween an optical communication connection and does not show a physical optical fiber.

FIG. 7B shows the optical fiber connections between the center node N1 (71) and six adjacent nodes N2 to N7 having a direct link to the center node N1 (71). For example, the center node N1 and the adjacent node N7 have therebetween three optical fiber links 73. Each of the three optical fiber links 73 includes, for the center node N1, a pair of two physical optical fibers consisting of an UP optical fiber and a DOWN optical fiber. In this specification, the pair of the UP optical fiber and the DOWN optical fiber is assumed as one fiber link. Specifically, if three optical fiber links exist between nodes, the nodes have thereamong the fiber degree (fiber Deg) of 3. The fiber degree can be defined in various manners. Thus, the UP optical fiber and the DOWN optical fiber are counted distinctively in some cases. However, in the description of this specification, the number of the pairs of the UP optical fibers and the DOWN optical fibers corresponds to the fiber degree between the two nodes for simplicity.

As shown in FIG. 7B, the center node N1 and each of the adjacent nodes N2 to N7 have therebetween a pair of optical fibers allocated in an amount corresponding to the traffic amount. In the case of the OXC device of the prior art, optical fibers connected to the center node N1 are indiscriminately recognized as the same ones without considering to which adjacent nodes these optical fibers specifically correspond. Furthermore, in the case of the OXC device of the prior art, the actual traffic amounts in already-connected optical fibers are used to determine whether an increase of optical fibers is required. However, any determination of the addition of optical fibers is automatically followed by the connection of the newly-added optical fibers to all adjacent nodes unconditionally. The reason is that, in the case of the OXC device of the prior art, it is already completed at the timing of the introduction of the device that the maximum configuration is estimated based on the maximum traffic predicted for the node and all output ports opposed to each other of the WSS within the device are mutually connected. The inventors considered that it is not required to assume, at the timing of the introduction of the device, the maximum configuration depending on the future maximum traffic amount or to mutually connect WSSs completely. Specifically, the concept of the inventors is to determine, for the optical fibers of each specific node, whether the internal paths of the WSS output port should be connected for each expansion of the OXC device while using the temporarily-changing trend of the traffic amount of the existing optical fibers.

FIG. 7C illustrates the connection status of the optical fibers considering the expansion of the OXC device performed with time. The optical fiber connection diagram of FIG. 7C illustrates the connection configuration of optical fibers between nodes at a certain timing after the progress of the expansion. In the actual optical network, in order to process the traffic at the start of the operation at the center node 71, it is frequently sufficient that each of adjacent nodes has one optical fiber link. In other words, it is sufficient, at the introduction of the OXC device, the center node and an adjacent node may require an optical fiber link 74-1 only connected to an end point shown by a black ■ of FIG. 7C. Regarding the optical fiber links 74-2 and 74-3 connected to end points shown by outlined Q, it is reasonable to determine, when it is predicted that the performance limit may be soon reached due to the increase of the traffic amount at each adjacent node, whether to increase the optical fibers so that optical fibers can be added as required at a required timing. Thus, there is no need, at a stage prior to the increase of the optical fibers, for the WSSs to be used at the maximum traffic in the remote future or the connection among these WSSs. If the traffic amount increases, the outlined Q can be limitlessly increased in principle. The inventors consider that the OXC device of the prior art configuration is relatively wasteful because the maximum configuration based on the predicted maximum traffic amount in the future is used as a precondition and the maximum number of components (WSS) is provided within the device at the introduction of the device.

Figure 8A:
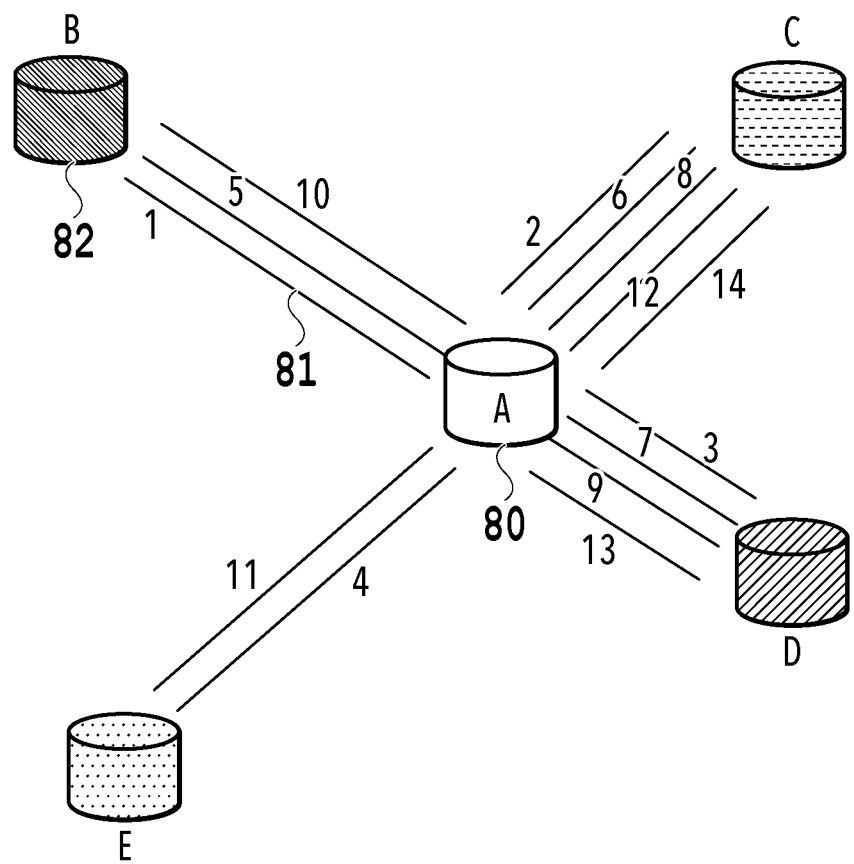
FIG. 8A illustrates the configuration of a network in which the OXC device of this disclosure is provided.
Figure 8B:
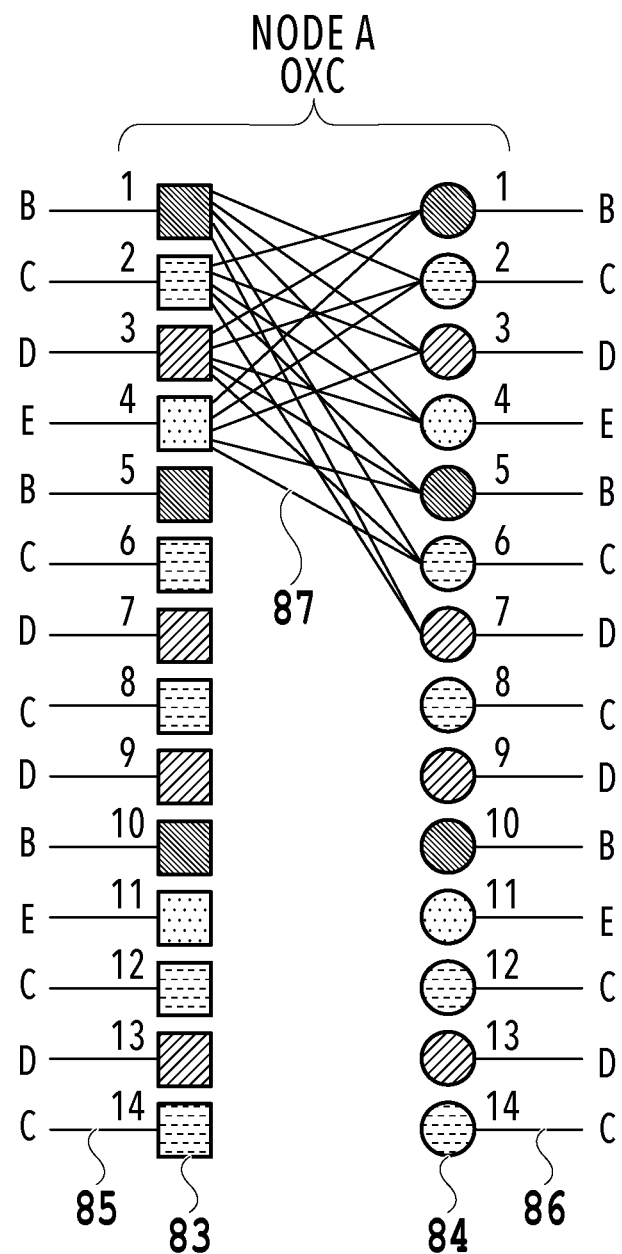
FIG. 8B is a concept diagram illustrating the configuration of the OXC device of this disclosure.

FIG. 8A and FIG. 8B are a concept diagram illustrating the configuration of the OXC device of this disclosure and surrounding adjacent nodes. FIG. 8A illustrates the configuration of a network in which the OXC device of this disclosure is provided. The following description will be made based on an assumption that the OXC devices of this disclosure are provided at all nodes having a plurality of optical fibers connected to adjacent nodes and the device is provided at a center node A (80). It is assumed that the center node A is surrounded by four adjacent nodes consisting of a node B, a node C, a node D, and a node E. The line 81 connecting the center node A to each adjacent nodes represents one optical fiber link. One optical fiber link corresponds to two optical fibers (a pair of an UP optical fiber and a DOWN optical fiber) for connecting the center node A to the adjacent node B (82) for example. Specifically, one optical fiber link is composed of the "input optical fiber" (UP optical fiber) extending from the node B to the center node A and the "output optical fiber" (DOWN optical fiber) extending from the center node A to the node B. The numbers shown on the line representing the optical fiber link are used to identify different optical fiber pairs (optical fiber links) on the same path and the expansion is performed in an order of the numbers as described later. In the network of FIG. 8A, the node degree $D_N$ (node Degree) is 4. In the OXC device of this disclosure, the WSS used in the device has the WSS degree $D_W$ of 5. In the following description, it is assumed that the OXC device at a certain timing always has equal input port number and output port number. In other words, any addition of optical fibers is performed by simultaneously increasing a pair of the "input optical fiber" and the "output optical fiber".

Figure 2A:
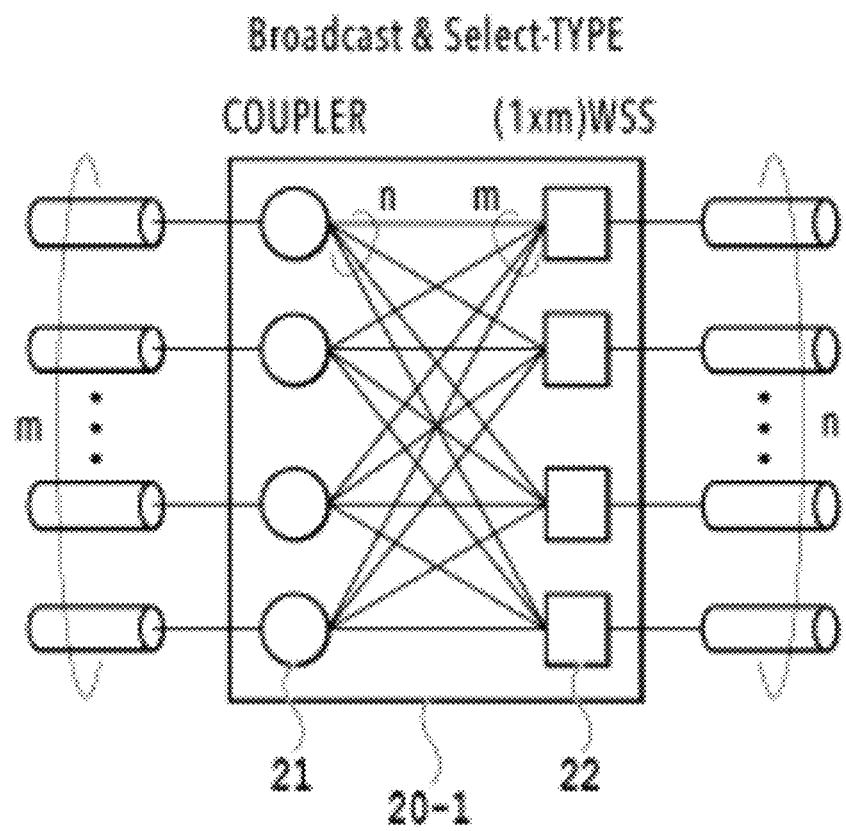
FIG. 2A is a concept diagram illustrating the configuration example of the OXC device of the prior art.
Figure 2B:
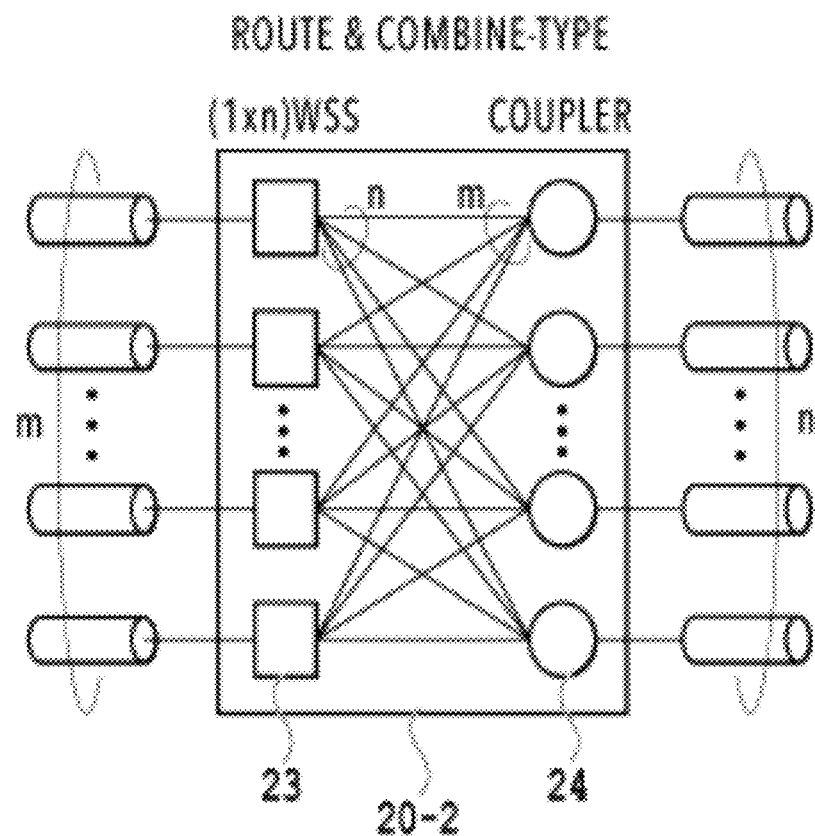
FIG. 2B is a concept diagram illustrating another configuration example of the OXC device of the prior art.
Figure 3:
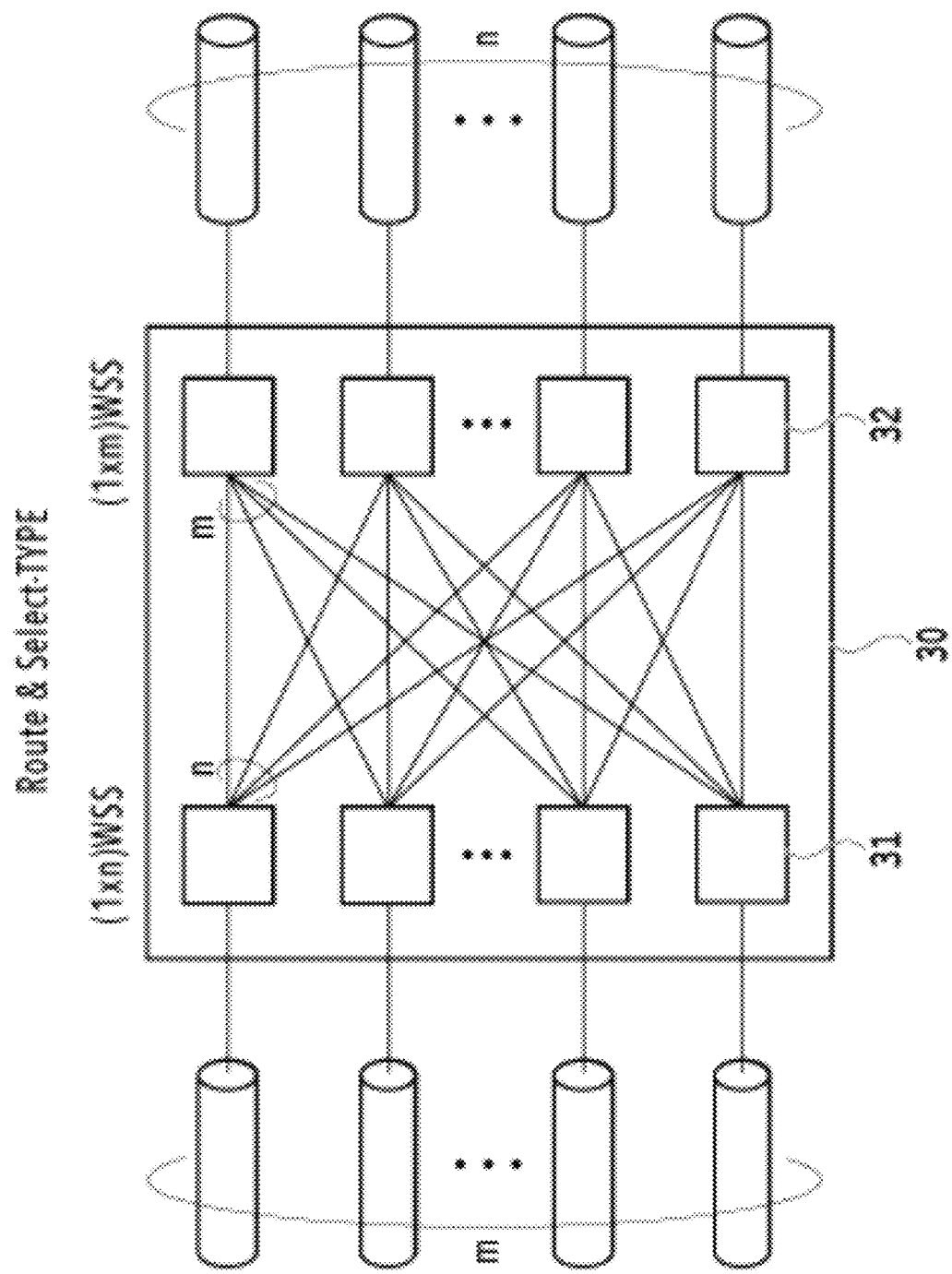
FIG. 3 illustrates the configuration of a route & select-type OXC device.

FIG. 8B is a concept diagram illustrating the configuration of the OXC device of this disclosure. The OXC device of this disclosure has the route & combine-type configuration of the conventional technique shown in FIG. 2B. This route & combine-type configuration of this disclosure is different from the route & combine-type configuration of the conventional technique of FIG. 2B in that the input port side connected to the input optical fiber 85 has a plurality of WSSs 83 and the output port side connected to output optical fiber 86 has a plurality of optical couplers 84. However, the route & combine-type configuration of this disclosure is significantly different from the OXC device of the prior art in that the respective configurations of the WSS 83 and the connection status between the WSS 83 and the optical coupler 84. It is noted that, although the procedure of expanding the OXC device and increasing the optical fibers will be described later, FIG. 8B shows the configuration of the OXC device of this disclosure at a certain timing in the middle of the extension work process of the optical fibers. Thus, at least the eighth and subsequent input optical fibers 85 and the eighth and subsequent output optical fibers 86 shown in FIG. 8B show the status of the configuration in which the network expansion corresponding to FIG. 8A is in progress and there is no need for the connection therebetween at a certain timing in the middle of the extension work process. Furthermore, the eighth and subsequent WSSs 83 for example may not be provided at a certain timing of the extension work. FIG. 8B shows, for the purpose of explaining the increase step shown in FIG. 9A to FIG. 9B and FIG. 10A to FIG. 10B described later, all optical fibers and components for convenience.

Figure 5A:
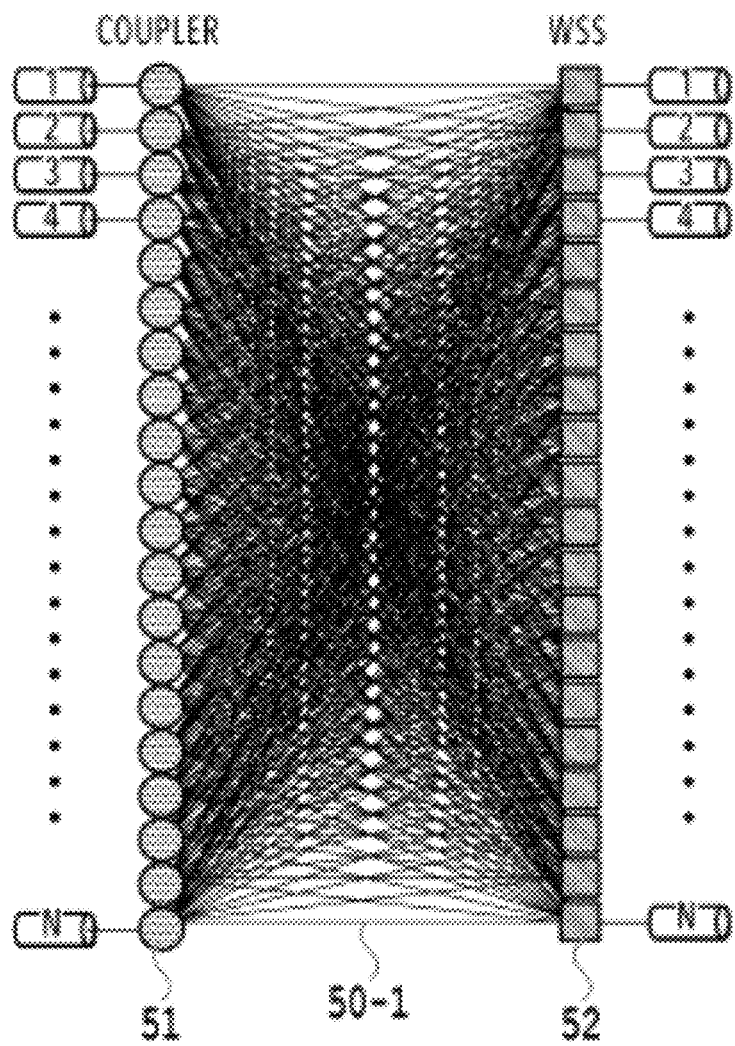
FIG. 5A illustrates the configuration of a large-scale broadcast & select-type OXC device of the prior art.
Figure 5B:
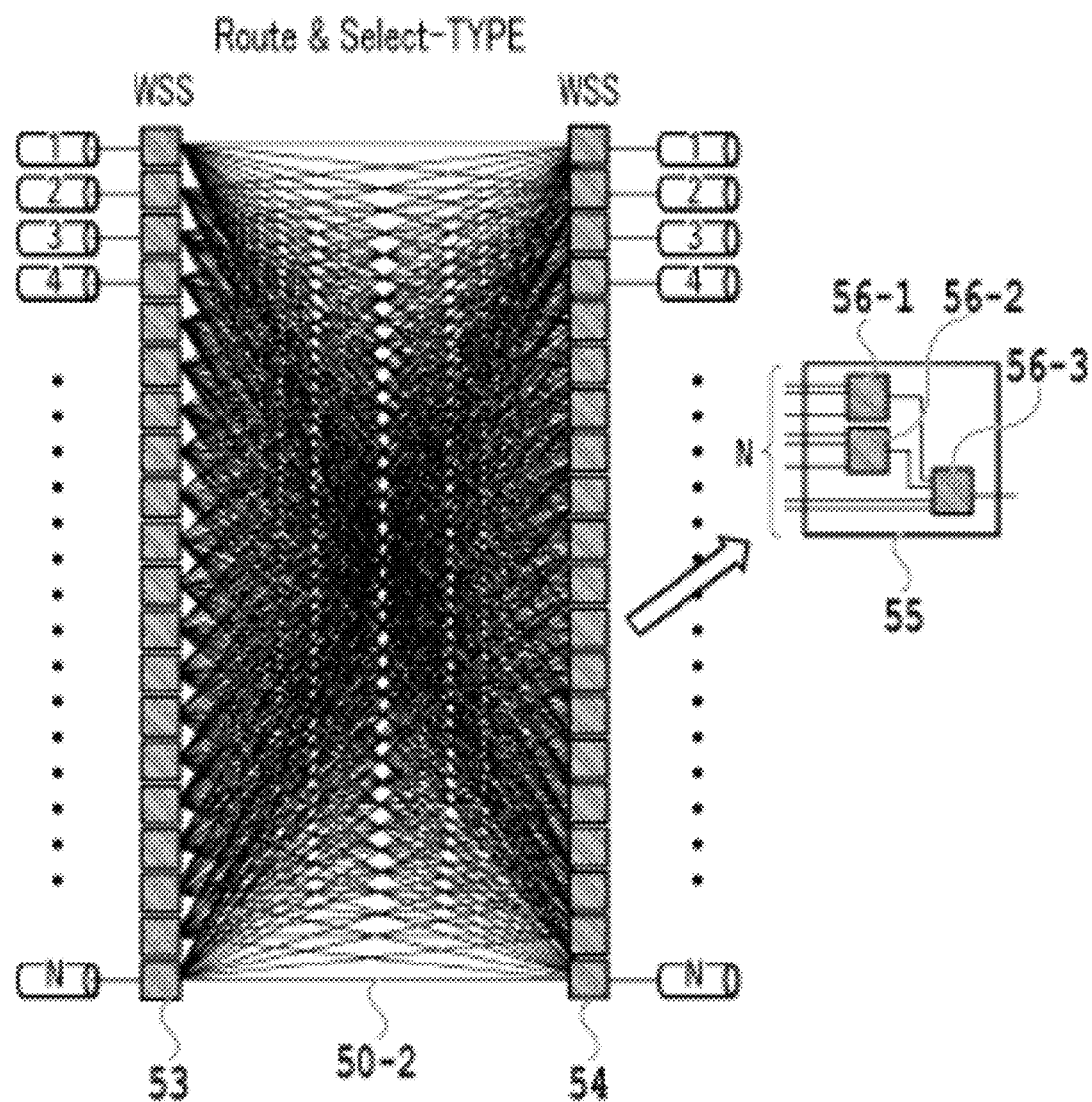
FIG. 5B illustrates the configuration of a route & select-type OXC device in which only a large-scale WSS of the conventional technique is used.

The OXC device of this disclosure is significantly different from the OXC device of the prior art in that the former uses extremely small-scale WSSs depending on the number of adjacent nodes surrounding the center node while the latter assumes the maximum traffic amount in the future. When the network shown in FIG. 8A has the node degree $D_N$ of 4, the WSS of the OXC device of this disclosure exemplarily uses a WSS having the WSS degree $D_W$ of 5. Specifically, the WSS ($D_W=5$) having a 1×5 configuration is used. This is contrasting to the case of the OXC device of the prior art in which the WSS having a large-scale configuration uses a configuration of 1×20 ($D_W=20$) or more for example. According to the OXC device of this disclosure, such a WSS may be used that has an extremely-small port number (ramification number) (or small $D_W$) when compared with the case of the conventional technique. This can consequently eliminates the need to use a large amount of the expensive WSS as shown in FIG. 5B in order to reduce the insertion loss in the route & select-type configuration. Even the route & combine-type configuration of FIG. 8B is allowed to the output port-side optical coupler 84 at an opposite side of the input port-side WSS 83 to have the ramification number as small as 5. This can consequently eliminate the need for the use of the WSSs at both of the input and output sides of the device and can suppress the insertion loss at the optical coupler 84 to about 7 dB at maximum.

Figure 6A:
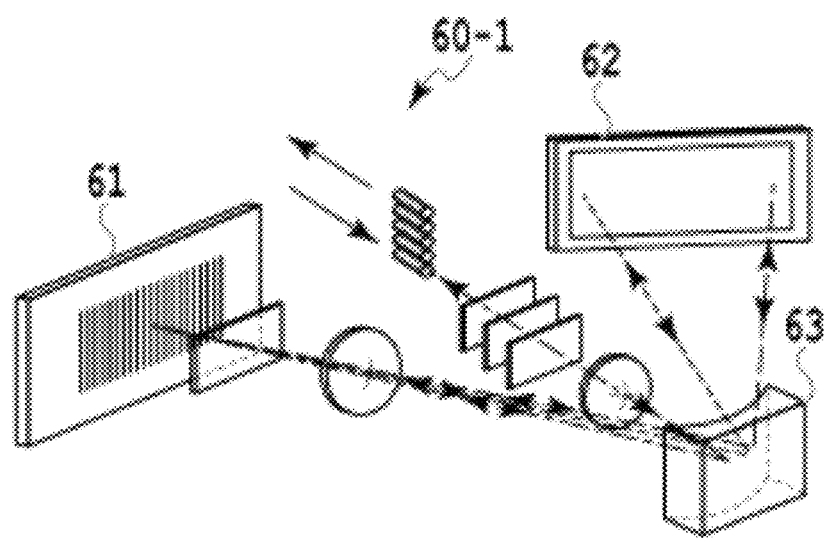
FIG. 6A illustrates a configuration example of a specific WSS of the WSS.
Figure 6B:
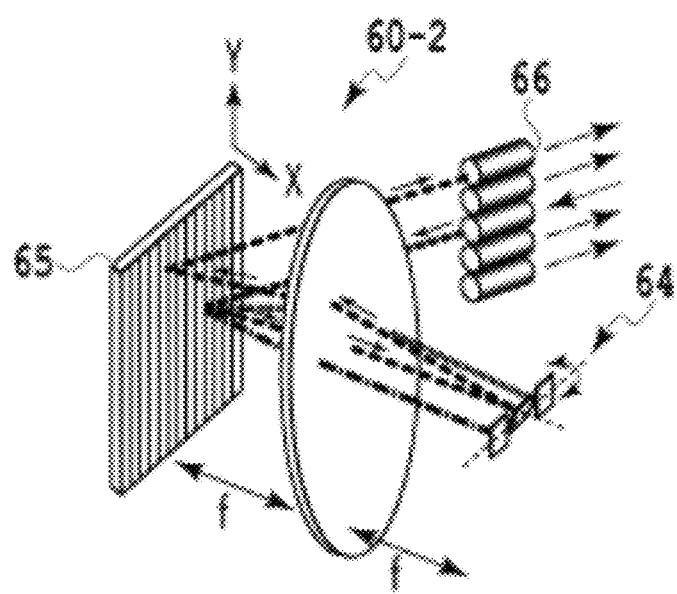
FIG. 6B illustrates a configuration example of another specific WSS of the WSS.
Figure 6C:
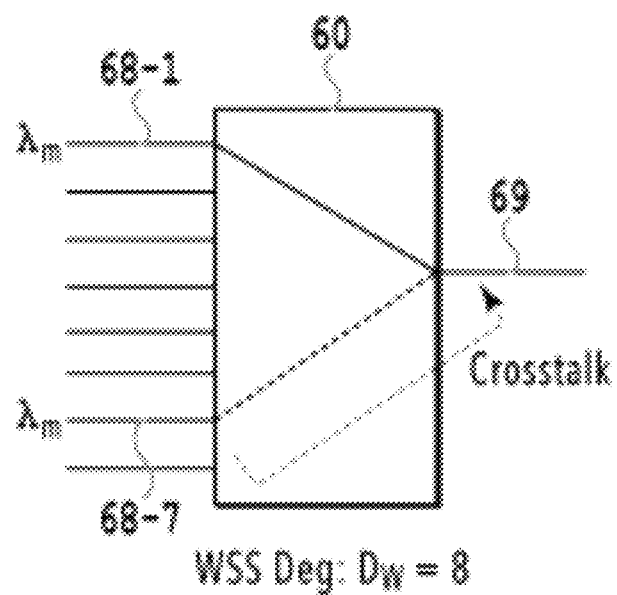
FIG. 6C illustrates the cross talk of the WSS.
Figure 19:
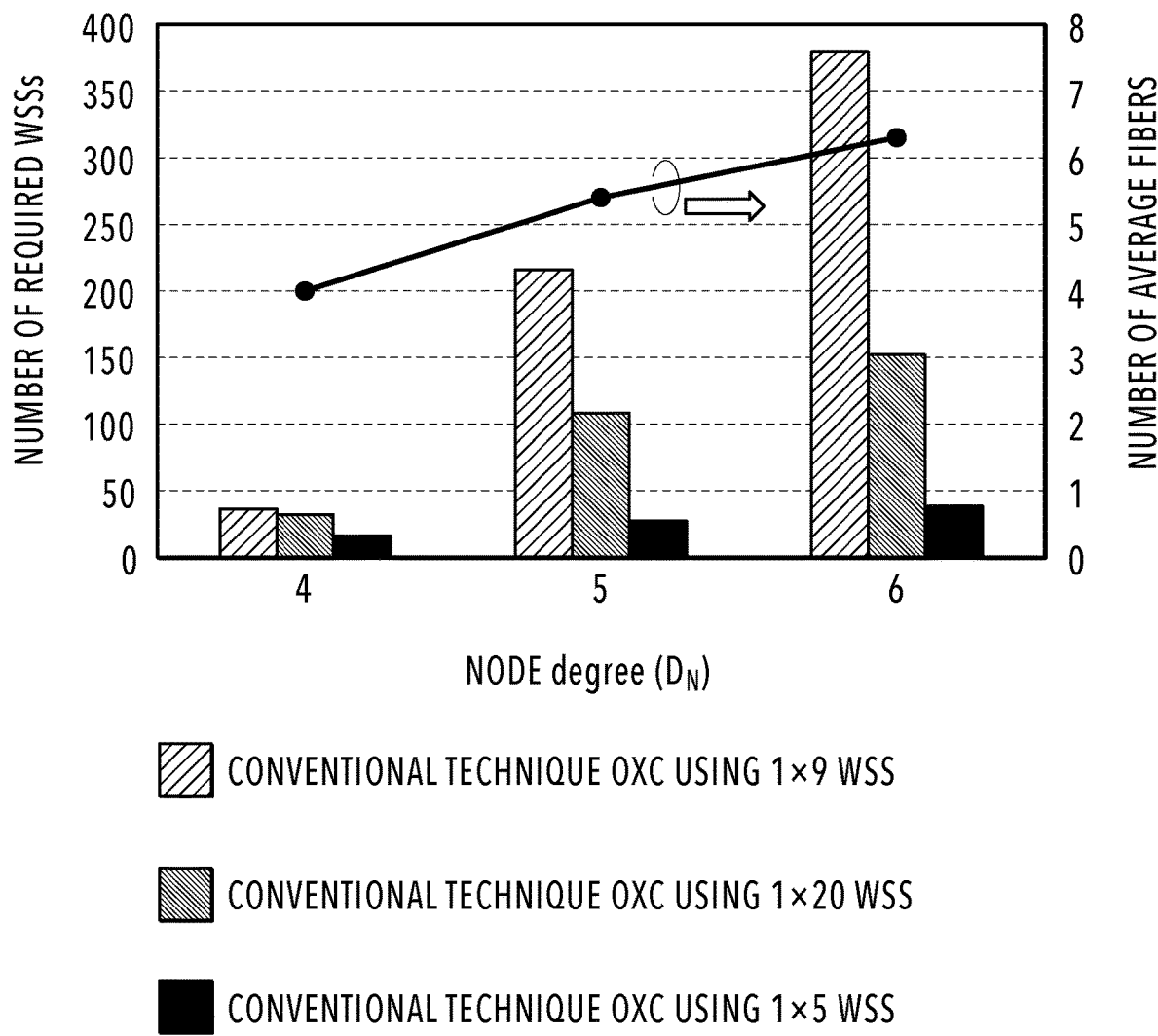
FIG. 19 illustrates, in the OXC device of this disclosure, the number of WSSs required in the final status of the calculation of the simulation of the increase when compared with the conventional technique.

Thus, the small-scale WSS in the OXC device of this disclosure does not require, in contrast with the conventional technique, to cascade-connect a plurality of WSSs to increase the number of the output ports, thus providing a configuration using a low-cost and small-scale WSS. Furthermore, the use of the small-scale WSS can eliminate the risk of the deteriorated performance due to the cross talk shown in FIG. 6C. Furthermore, even when the optical coupler is used, the small ramification number and the small insertion loss can provide the use of the route & combine-type or broadcast & select-type device configuration in which only the input side or the output side includes a WSS. The number of WSSs to be used can be significantly used since there is no need for the route & select-type configuration requiring the large-scale WSSs to be used both at the input port side and the output port side. The use of the OXC device having the configuration of this disclosure can significantly reduce, when compared with the conventional technique, the cost of the large-scale OXC device for which the number of the input and output ports exceeds 20 for example. The effect of the reduction of the number of specific WSSs in the OXC device of this disclosure will be described in detail in Embodiment 1 (FIG. 19).

Another significant difference between the OXC device of this disclosure and the one according to the conventional technique is that, in the case of one WSS 83 connected to one optical fiber, the connection by the internal path from the WSS 83 to the opposing optical coupler 84 is limited, at maximum, to the WSS degree $D_W$ of 5. The OXC device of the prior art is configured so that all output ports of the WWS opposed to each other in the device are mutually connected completely. Specifically, it is assumed that all WSSs are mutually connected via internal paths in order to cope with the OXC device of the maximum configuration estimated based on the predicted maximum traffic amount in the future. Specifically, the device is introduced only after the mutual connection of the internal paths among all WSSs is completed in consideration of the complicated work required for the increase in the middle of the operation, the risk of an accident involved in the operation, and the work cost.

In contrast with this, the OXC device of this disclosure require only five output ports of the WSS 83 that are of course not connected to all of the 14 optical couplers oppose to each other of FIG. 8B. In other words, one input optical fiber from a certain adjacent node to the center node is connected only to some of the output optical fibers extending from the center node and is connected only to a predetermined number of output optical fibers (or $D_W$ output optical fibers) at maximum. Thus, the hardware configuration of the OXC device of the prior art is started from the "maximum configuration" assuming an increase of the future traffic. The OXC device of this disclosure on the other hand does not use the concept of the maximum configuration. On the contrary, the OXC device of this disclosure can realize the introduction of the device with the first hardware configuration having the "minimum configuration", which is quite contrary to the conventional technique. It is noted that this characteristic of realizing the introduction of the OXC device of this disclosure with the "minimum configuration" leads, as described later, to the flexible and scalable device expansion and the capability of increasing optical fibers. It is noted that the OXC device of this disclosure is based on a concept totally different from the concept of the conventional technique in the device configuration and expansibility.

Thus, the OXC device of this disclosure is an optical cross-connect (OXC) device having one or more input optical fibers 85 connected to a plurality of input ports and one or more output optical fibers 86 connected to a plurality of output ports. The input optical fibers and the output optical fibers are mutually connected by N adjacent nodes (N is a natural number) 82. A wavelength-multiplexed optical signal inputted to one of the input ports is wavelength-routed to any of the plurality of output ports. The optical cross-connect (OXC) device has a plurality of wavelength selective switch (WSS) 83 having a $1 \times N_{WSS}$ configuration so that at least one of the input port side or the output port has each input port connected to any of the input optical fibers and the output optical fibers and has $N_{WSS}$ output ports. The $N_{WSS}$ output ports of one WSS connected to one adjacent node in the plurality of WSSs 83 are connected, via the internal path 87, to a fixed number of optical fibers of the optical fibers 86 connected to the N−1 adjacent nodes except for the one adjacent node among the input optical fibers or the output optical fibers at an opposite side of the one side. The OXC device is configured so that new input optical fibers and output optical fibers can be increased by providing additional WSSs in addition to the plurality of WSSs.

FIG. 8B shows the status in the middle of the increase step to connect the fourth input optical fiber from the node E already connected to the first to third output optical fibers to the fifth output optical fiber to be newly provided to the node B and the sixth output optical fiber to be newly provided to the node C, respectively. Next, the feature of this disclosure will be clarified through the description of the more-specific increase steps of the OXC device of this disclosure.

FIG. 9A to FIG. 9B and FIG. 10A to FIG. 10B illustrate, in a stepwise manner, a process to increase the OXC device of this disclosure from the initial configuration status. FIG. 9A, FIG. 9B, FIG. 10A, and FIG. 10B show how the OXC device is expanded at the center node A in an order of FIG. 9A, FIG. 9B, FIG. 10A, and FIG. 10B. FIG. 9A to FIG. 9B and FIG. 10A to FIG. 10B will be described based on such a network configuration that is exactly the same as the configuration of FIG. 8A and this configuration will not be described further. In the respective drawings, the upper side shows how the optical fiber links are connected among nodes at the timing while the lower side shows the internal connection status of the input-side WSSs and the output-side optical couplers of the OXC device at the center node A. The WSS has the WSS degree $D_W$ of 5 and the WSS uses a 1×5 configuration. In the respective drawings, it is noted that the respective adjacent nodes connected to the node A are hatched in a manner corresponding to the WSSs and optical couplers connected to the node.

Figure 9A:
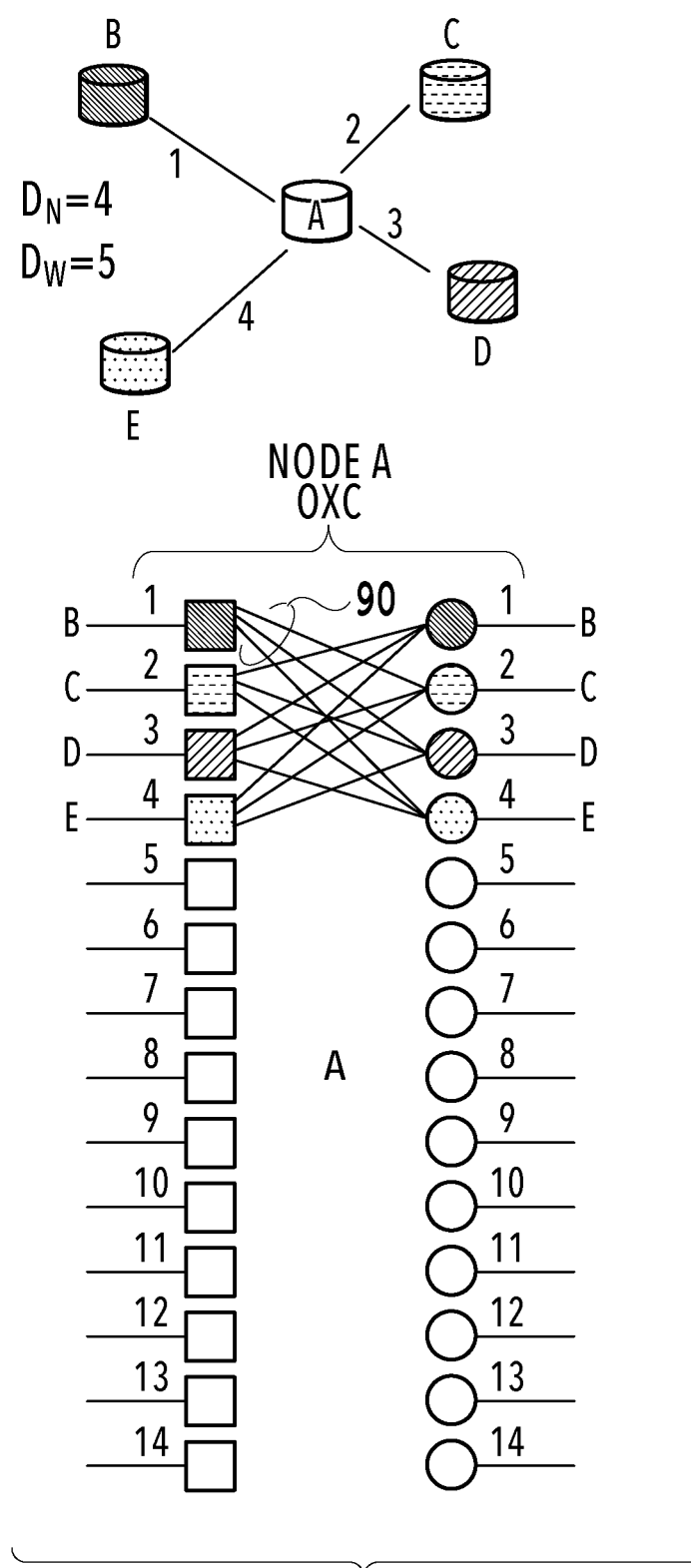
FIG. 9A illustrates, in a process of increasing the OXC device of this disclosure, the network status at a timing at which the operation of the node A is started and the OXC device status (the first status)

With reference to FIG. 9A, FIG. 9A shows the network status and the OXC device status (the first status) at which the operation of the node A is started. Each of the node A to the nodes B to E corresponds to one optical fiber link (a pair of an "input optical fiber" and an "output optical fiber"). For the node B (target adjacent node), for example, the first input optical fiber is connected to the uppermost WSS and the first output optical fiber connected to the uppermost optical coupler. In this status, the respective first to fourth WSSs have three internal connections 90 within the OXC device extending to other adjacent nodes except for the target adjacent node. It is noted that there is no need to connect the input optical fibers and output optical fibers of the same target adjacent node within the OXC device. The reason is that such a connection constitutes a path from the node B to the node B and such a routing is meaningless. Thus, at the center node at which the OXC device of this disclosure is provided, the input optical fiber and the output optical fiber of the same target adjacent node are generally connected. The reason is that the OXC device diagram at the lower side has no "horizontal connection line" connecting optical fibers having the same number. According to the configuration of the OXC device of this disclosure, the configuration can be expanded so as to connect the input optical fiber and the output optical fiber of the same target adjacent node.

In the status of FIG. 9A, any of the WSSs does not use all outputs yet. Thus, an arbitrary path can be configured so long as the communication traffic amount does not exceed the permissible amount of one optical fiber. FIG. 9A shows 14 WSSs and 14 optical couplers as an example for the purpose of explaining the entirety including FIG. 10A to FIG. 10B described later. At this timing, the fifth and subsequent WSSs and optical couplers in an order from the top are not required at all. The OXC device of this disclosure has, in the initial status, the first to fourth WSSs and the first to fourth optical couplers and can allow the node A to be operate so long as the first to fourth WSSs and the first to fourth optical couplers are mutually connected. Thus, in a subsequent stage of increasing optical fibers (which will be described later), a modularized WSS or optical coupler may be added to the OXC device. Thus, it is noted that FIG. 9A shows WSSs and optical couplers not yet user by outlined symbols. The same applies to FIG. 9B and FIG. 10A to FIG. 10B.

Regarding this point, the OXC device of the prior art requires one WSS to be connected to one port of all WSSs at an opposing side. Although the OXC device of the prior art also can add WSSs in a stepwise manner WSS, the OXC device of the prior art causes a configuration having a complicated internal connection in which the WSS has the port number exceeding 20. The work to add WSSs in a stepwise manner in the middle of the operation of the device is burdensome and also may cause a risk of an accident. Thus, the extension work to add WSSs during the operation is practically difficult. The OXC device of this disclosure of FIG. 9A on the other hand provides the WSS port number of 5 at maximum and provides a simple internal connection to the optical couplers within the device. Thus, the connection work within the device is remarkably simple and the stepwise increase of the WSSs is also simpler than in the case of the conventional technique. As described above, at the initial stage of the introduction of the OXC device of this disclosure, the service can be started in the initial status including the minimum number of WSSs and components such as optical couplers. Thus, this point also allows the cost of the initial introduction of the OXC device to be remarkably lower than in the case of the OXC device of the prior art.

Figure 9B:
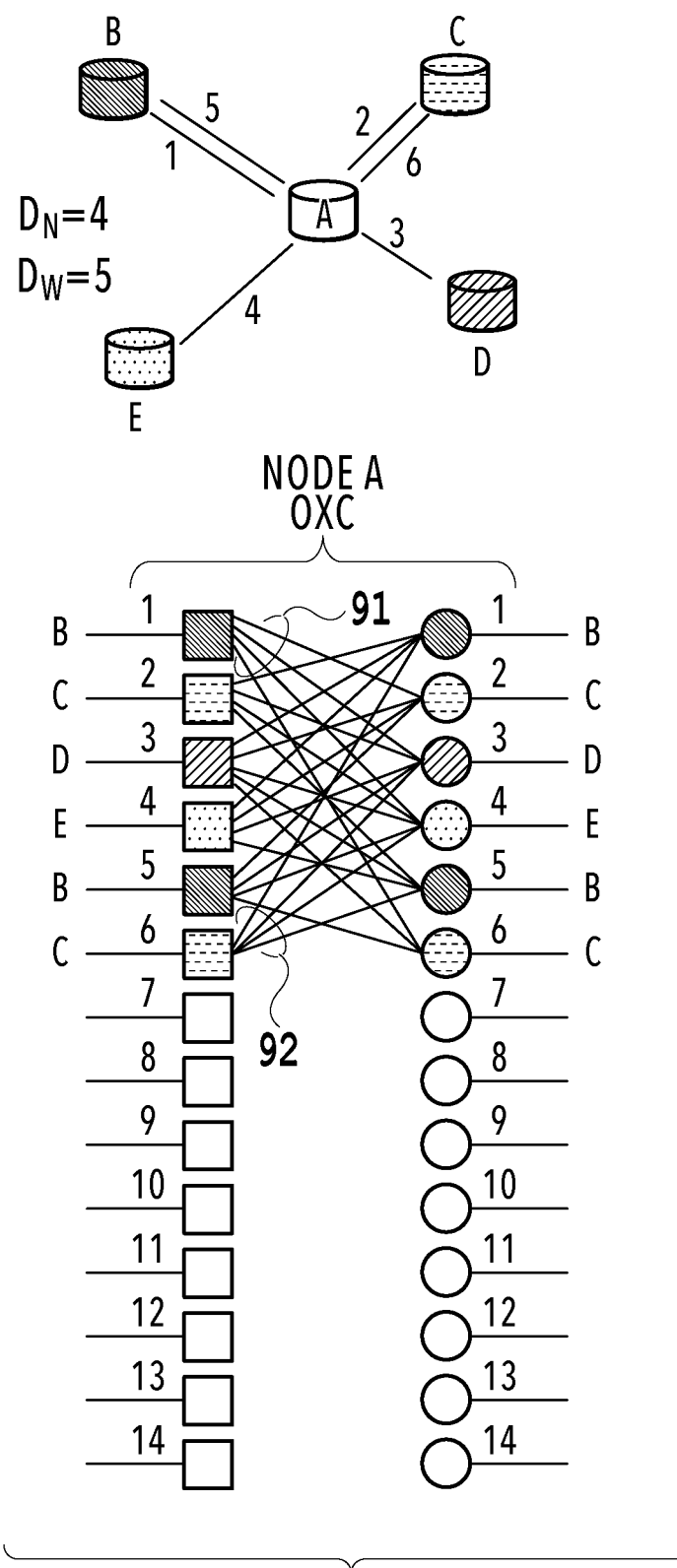
FIG. 9B illustrates, in the process of increasing the OXC device of this disclosure, a status in which optical fibers are increased at two nodes (the second status)

Next, with reference to FIG. 9B, FIG. 9B shows a status (the second status) in which, after the start of the operation of the node A, optical fibers are additionally added to two nodes. In accordance with the increase of the traffic between the center node A and the node B and the node C, the fifth optical fiber link extending from the center node A to the node B and the sixth optical fiber link extending to the node C are added, respectively. At this point of time, the WSS of the first input optical fiber from the node B is connected to four output optical fibers via four internal connections 91 but all connection ports are not used yet. In accordance with the increase of the traffic at the node B, the fifth input optical fiber from the node B is newly connected and the corresponding WSS is connected to four output optical fibers via four internal connections. Similarly, the sixth input optical fiber from the node C is connected and the corresponding WSS is connected to four output optical fibers via four internal path connection 92.

In the status of FIG. 9B, not all ports of the already provided WSS are used but the newly-added two pairs of optical fibers provide the total of 6 paths to the optical fiber links. As described above, FIG. 9B shows the seventh and subsequent optical couplers of the WSS are shown. However, this is for a description purpose and these components not yet used at this point of time are not required. Thus, it can be understood that the OXC device of this disclosure allows the device configuration to be expanded in a stepwise manner depending on the network traffic demand.

Figure 10A:
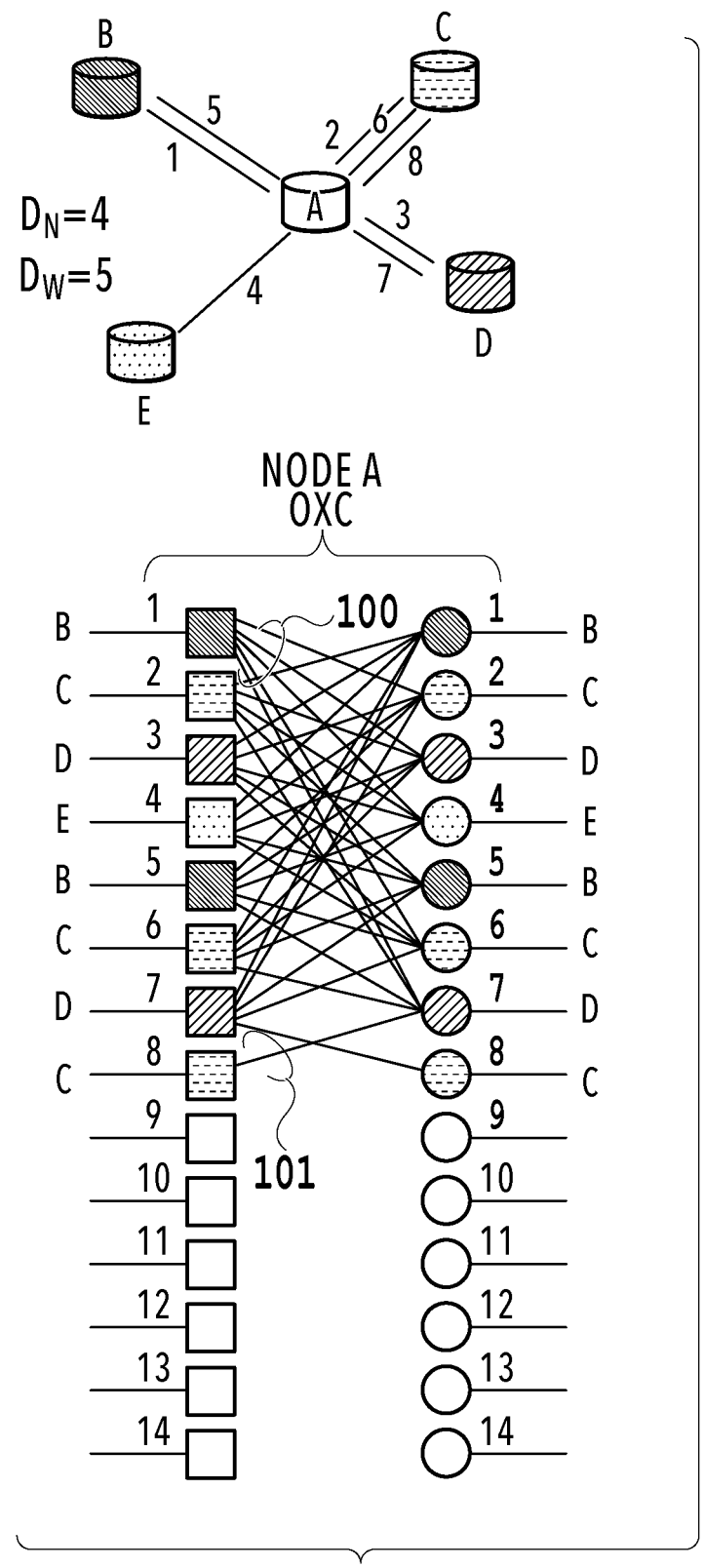
FIG. 10A illustrates, in the process of increasing the OXC device of this disclosure, a status (the third status) in which the optical fibers are increased at the nodes C and D due to an increase of the traffic amount.

FIG. 10A a status (the third status) in which the network traffic amount further increases and new optical fibers are further increased at the node C and the node D. In this status, an increase of the traffic among the center node A, the node C, and the node D causes the addition of the eighth optical fiber link from the center node A to the node C and the addition of the seventh optical fiber link to the node D. In this status, all five ports of the first WSS connected to the first input optical fibers are used. The connection 100 by the five internal paths is used to connect the second output optical fiber to the node C, the third output optical fiber to the node D, the fourth output optical fiber to the node E, and the sixth output optical fiber to the node C, and the seventh output optical fiber to the node D. The eighth input optical fiber from the node C is newly connected. The eighth output port of the WSS is connected only to the seventh output optical fiber via the internal path connection 101. This shows a typical difference between the OXC device of the prior art and the configuration of the OXC device of this disclosure in that the configuration of the OXC device of the prior art allows one WSS to be connected to all opposing WSSs opposed to one WSS while the configuration of the OXC device of this disclosure allows one WSS to be connected only to a part of the opposing WSS (output optical fiber) via the internal path. An arbitrary algorithm can be applied to a method of connecting input ports and output ports in the OXC device of this disclosure, the details of which will be described later.

Figure 10B:
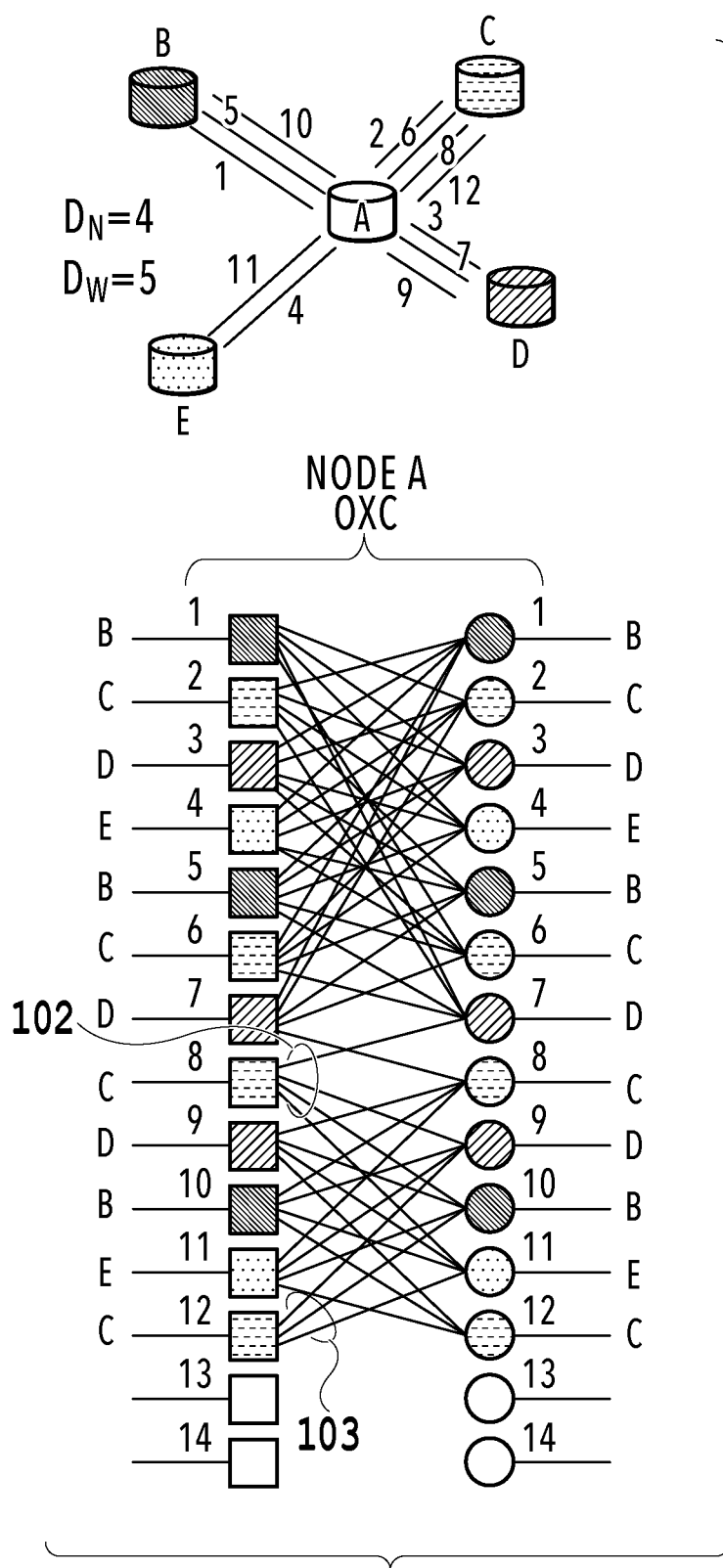
FIG. 10B illustrates, in the process of increasing the OXC device of this disclosure, a status (the fourth status) in which the optical fibers are increased at the nodes B and E due to an increase of the traffic amount.

FIG. 10B illustrates a status (the fourth status) in which the network traffic amount further increases and new optical fibers are increased from the node B to the node E. In accordance with the increase of the traffic to all adjacent nodes, the ninth optical fiber link is added to extend from the center node A to the node D, the tenth optical fiber link is added to extend to the node B, the eleventh optical fiber link is added to extend to the node, and the twelfth optical fiber link is added to extend to the node C, respectively. In this case, the eighth input optical fiber from the node C is newly connected to three output optical fibers via the internal path connection 102. At this point of time, all ports of the first to seventh WSSs and the optical coupler are connected. The twelfth input optical fiber from the node C is connected and the twelfth three output ports of the WSS are connected only to the newly-added ninth, tenth, and eleventh output optical fibers via the internal path connection 103.

As is clear from the increase process of the OXC device from the first status to the fourth status shown in FIG. 9A to FIG. 9B and FIG. 10A to FIG. 10B, the OXC device of this disclosure allows, in accordance with the increase of the traffic at the center node, the components within the device to be increased depending on the increase of the traffic while sequentially adding small-scale WSSs (or WSSs having a small $D_W$) and couplers. At a stage at which the service of the device is started or one increase event is completed, at least some ports the WSS within device are not yet connected. This is contrasting to the OXC device of the prior art in that the OXC device of the prior art requires, at least at a stage in which the WSS is provided within the device, all ports of the WSS to be already connected to opposing WSSs.

According to the OXC device of this disclosure, by sequentially adding small-scale WSS as required, the increase of optical fibers can be handled and the device can be flexibly expanded depending on the increase of the traffic. As has been described above, in FIG. 9A to FIG. 9B and FIG. 10A to FIG. 10B, only 14 WSSs and optical couplers are used as components of the OXC device for the purpose of the description. However, the numbers of the WSSs and optical couplers are not limited to any number in the OXC device of this disclosure. By providing the housing of the OXC device with sufficient size and space or by configuring the housing so that the sequential increase is possible, the numbers of the WSSs and the optical coupler can be further increased, thus providing an unlimited increase of the devices. In the case of the OXC device of the prior art on the other hand, once the maximum configuration is determined based on the determined numbers of input ports and output ports, an increase exceeding the maximum configuration is difficult and inefficient. The reason is that the increase can be performed only based on the maximum configuration as a unit and the increase requires many not-yet-operated components for a relatively-long period, which is extremely inefficient. According to the OXC device of this disclosure, a pair of optical fibers can be increased as a minimum unit without waste, thus providing the device expansion having much scalability than in the case of the conventional technique.

In the case of the conventional technique, when the increase is performed based on the maximum configuration as a unit and an optical signal is outputted over a plurality of OXC devices within the same node for example and when the device A having the maximum configuration and the device B having the maximum configuration are used, an optical signal from the input optical fiber connected to the device A is outputted through the output optical fiber of the device A and is sent via the input optical fiber of the device B from the output optical fiber of the device B and the optical signal exits the node. In this case, the optical signal path-switched by the increased OXC device of the prior art passes through the OXC device two times, which causes a significant deterioration of the signal. In the case of the OXC device of this disclosure on the other hand, the optical signal passes through a pair of the optical coupler and the WSS only one time even when any amount of WSSs is added to expand the device configuration and regardless of the entire scale of the device. Thus, it is understood that the OXC device of this disclosure is superior to the OXC device of the prior art in the quality of the optical signal.

As described above, the OXC device of this disclosure can use a broadcast & select-type or route & combine-type OXC device obtained by combining a small-scale WSS and an optical coupler. The number of WSSs used within the device can be reduced to a half or less of that of the route & select-type conventional technique. Furthermore, the device can be used that has a small WSS degree $D_W$ and that has a lower cost. In order to suppress the loss in the path setting due to contention to provide a certain performance of the optical switch, the following formula is desirably satisfied based on the size of the WSS (i.e., the relation between the WSS degree $D_W$ (WSS Degree) and the node degree $D_N$).

$$D_W \geq D_N - 1 \qquad \text{Formula (1)}$$

In the examples of FIG. 9A to FIG. 9B and FIG. 10A to FIG. 10B, the node degree $D_N$ is 4 and thus the WSS degree may be 3 or more. In the configuration of the conventional technique, the WSS degree is contrasting with the number of the maximum optical fibers (pair number) assumed for the center node. In the above formula (1), an extremely-small port number (i.e., an extremely-small WSS degree $D_W$) requires an increase of the optical fiber links in order to secure the traffic throughput. In such a case, an insufficient configuration is caused against an intention in terms of fibers and nodes. Thus, the above formula (1) means that the WSS requires a fixed size. Thus, the formula (1) shows the minimum configuration of the WSS as a reference but is not always required. Embodiment 1 (which will be described later) similar to the examples of FIG. 9A to FIG. 9B and FIG. 10A to FIG. 10B shows, as an example, the case of the WSS having a 1×5 configuration ($D_W=5$). The configuration of the specific WSS will be further described in FIG. 14.

FIG. 9A to FIG. 9B and FIG. 10A to FIG. 10B have been described so that, in consideration of the general traffic amount among specific nodes and without using a specific algorithm, WSSs and optical couplers are sequentially expanded in spaces of the device to connect internal paths to increase the optical fibers. According to the OXC device of this disclosure, all input optical fibers and output optical fibers are not always mutually connected except for the initial stage of the introduction having a small traffic amount. In other words, input optical fibers connected to a certain node are connected only to some output optical fibers among a fixed number of output optical fibers. Output optical fibers connected to a certain node are connected only to some input optical fibers among a fixed number of input optical fibers. Thus, it is conceivable that a risk may be caused where the path cannot always be set with 100% probability. However, the OXC device of this disclosure uses a finer algorithm based on the traffic amount to increase optical fibers. This can consequently provide the accommodation of the traffic substantially equal to the conventional technique in which all paths connected among nodes prevent a path setting from any failure (loss) so long as the increase is performed at an appropriate timing. The following embodiment shows a specific algorithm of the procedure of the connection in the device (internal path connection) and shows the details of the specific effect by the OXC device of this disclosure.

Embodiment 1

In Embodiment 1, at a stage of the increase of the optical fibers, an algorithm will be described to connect new optical fibers based on the usage rate of existing optical fibers. In Embodiment 1, when input optical fibers are connected to output optical fibers via internal paths in the OXC device, whether these optical fibers should be connected is determined based on the usage rate of the existing optical fibers. In the case of the conventional technique, all input optical fibers and all output optical fibers are connected completely and thus no contention is caused in the path setting so long as the processable number is not exceeded. In the OXC device of this disclosure on the other hand, all input optical fibers and all output optical fibers are not connected completely. However, the contention in the path setting can be suppressed to an extremely-small amount by appropriately selecting the threshold value of the usage rate of optical fibers in order to determine the connection of the internal path.

Figure 11:
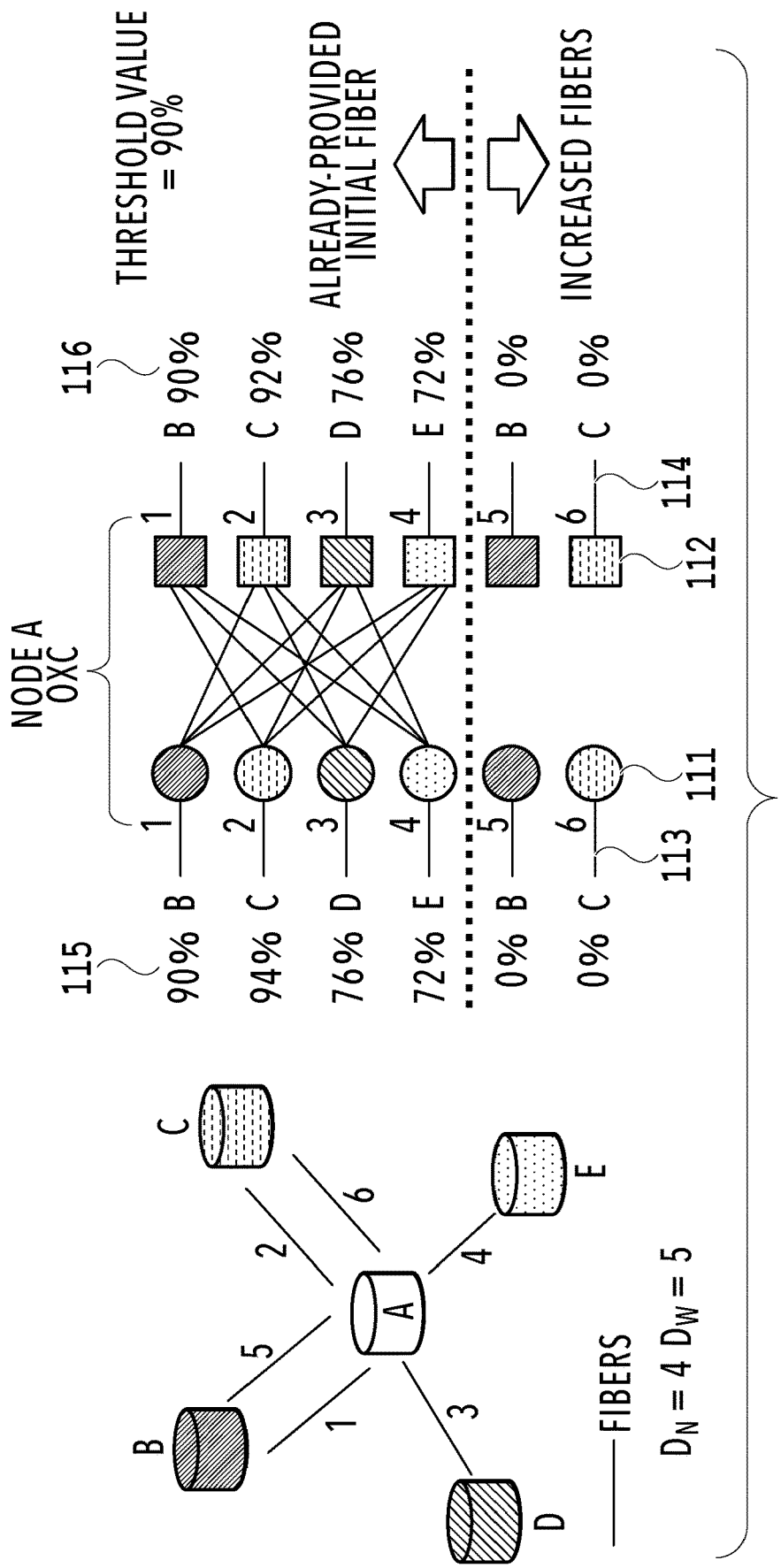
FIG. 11 illustrates a network configuration in which the OXC device of Embodiment 1 operates and the initial status of the device.

FIG. 11 illustrates the network configuration and the initial status of the device of the OXC device of Embodiment 1. The left-side diagram of FIG. 11 shows the center node A and four adjacent node B to adjacent node E and the node degree is $D_N=4$. The WSS degree has $D_W=5$ so that the formula (1) is satisfied. Thus, the network configuration in which the OXC device operates is the same as in the case of FIG. 9A to FIG. 9B and FIG. 10A to FIG. 10B. The optical fibers already set in the initial status are denoted with the reference numerals 1 to 4. The following description is based on a situation to newly add, for the purpose of increasing the traffic, the fifth increase optical fiber to the node B and the sixth increase optical fiber to the node C.

The right side of FIG. 11 shows the configuration of the OXC device at the center node A at the timing just before the increase of optical fibers. In Embodiment 1, the input optical fiber 113 from the target adjacent node is connected to the input side having the optical coupler 111 and the output optical fiber 114 to the target adjacent node is connected to the output side has the WSS 112. Specifically, in Embodiment 1, an example of the OXC device having the broadcast & select-type configuration is shown. The first to fourth optical fibers at the upper side of the dotted line are already-set initial optical fibers. The numerical values shown adjacent to the input fibers and the output fibers represent the usage rates of the respective optical fibers at the current point of time. Specifically, the numerical values shown by the reference numeral 115 represent the usage rates of the input optical fibers from the respective adjacent nodes to the center node A and the numerical values shown by the reference numeral 116 represent the usage rates of the output optical fibers from the center node A to the respective adjacent nodes.

The usage rate of the optical fibers may be the ratio of the number of the currently-used channels or a ratio of the maximum number of carriers that can be set and the number of the currently-used carriers in the usable communication band for example to the total number of optical communication channels that can be used in the respective fibers in a target system. The usage rate shows how much optical fibers are used and may be the ratio between the maximum frequency band that can be allocated to the target optical fibers and the sum of the currently-used light path bands or the ratio between the number of light paths that can be accommodated in target optical fibers and the number of the currently-used light paths. These ratios have the maximum value of 100%. Thus, when 100% is approached closer, a smaller margin is caused to add new traffic, causing a high necessity to increase new optical fibers.

Figure 12A:
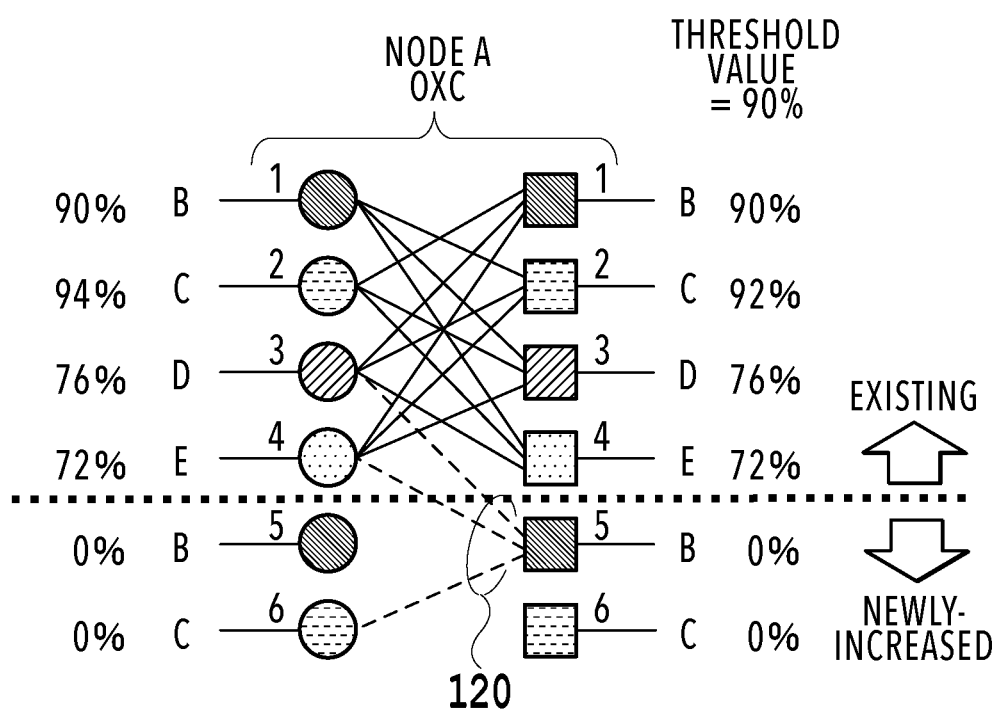
FIG. 12A is a first diagram illustrating an algorithm to increase the output optical fibers in the OXC device of Embodiment 1.
Figure 12B:
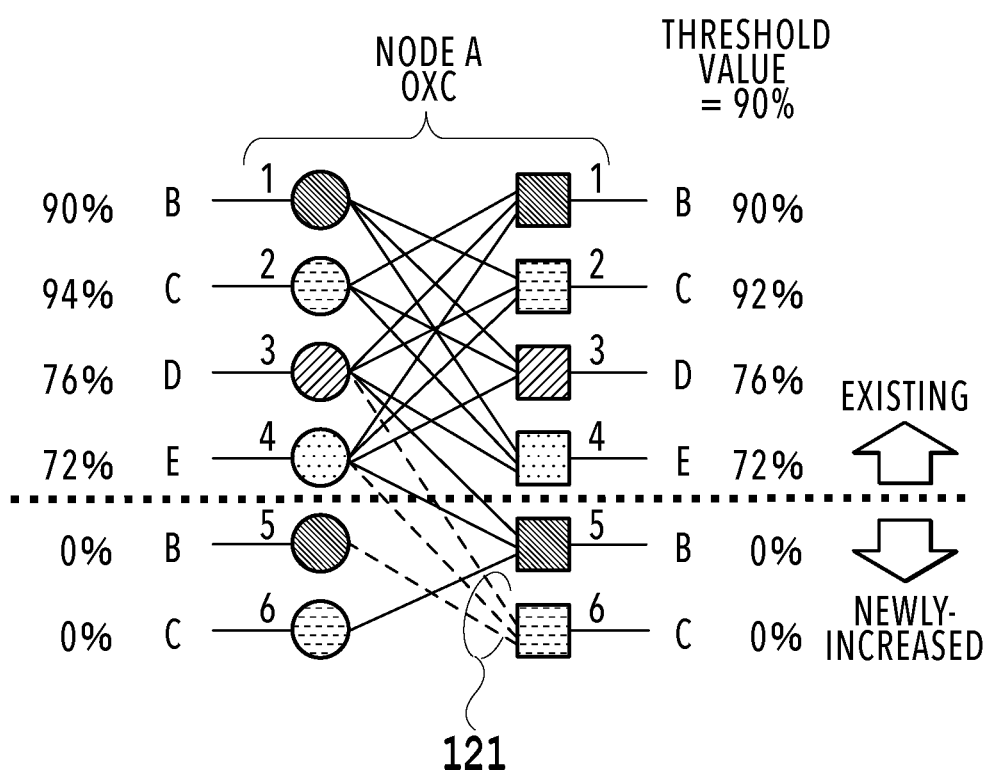
FIG. 12B is a second diagram illustrating an algorithm to increase output optical fibers in the OXC device of Embodiment 1.
Figure 13A:
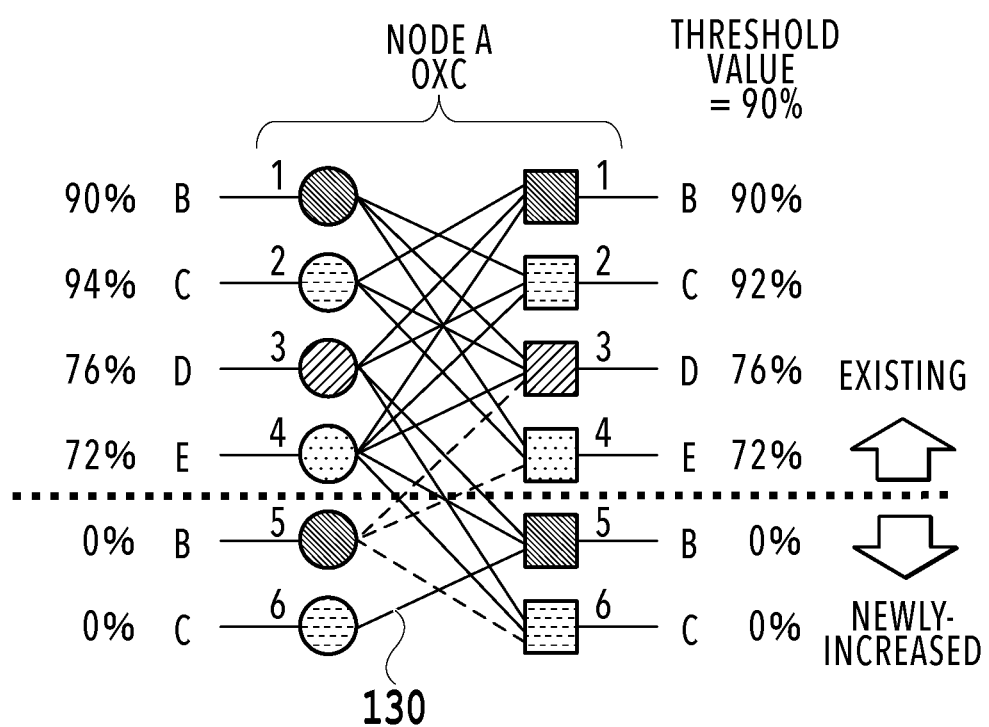
FIG. 13A is a third diagram illustrating an algorithm to increase the input optical fibers in the OXC device of Embodiment 1.
Figure 13B:
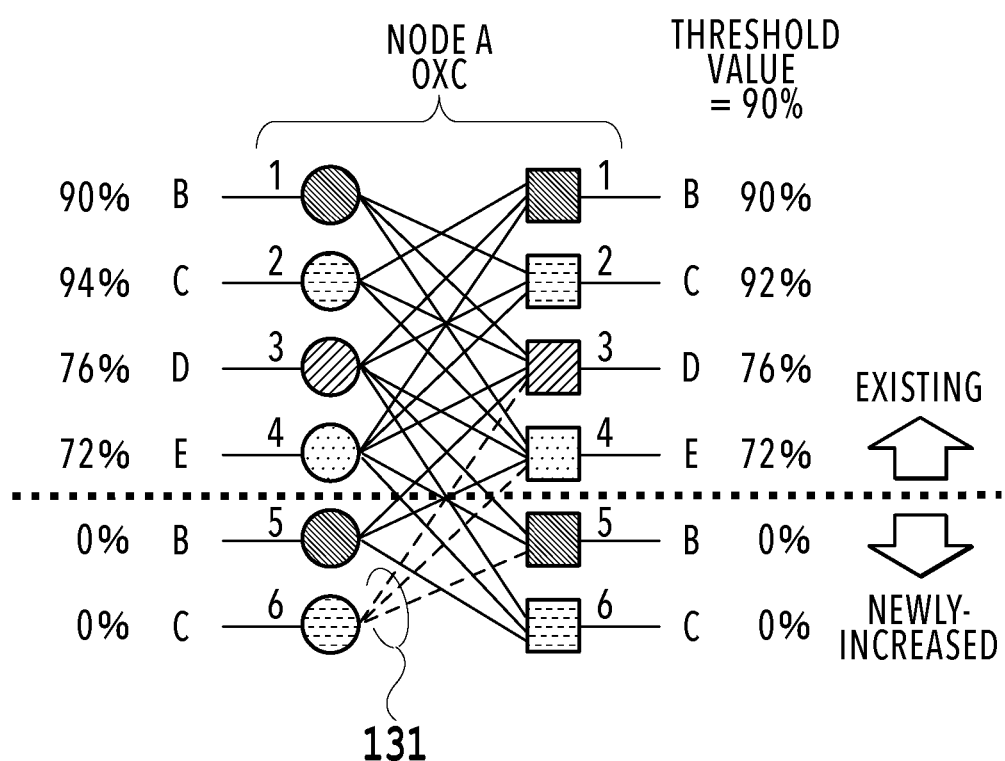
FIG. 13B is a fourth diagram illustrating an algorithm to increase the input optical fibers in the OXC device of Embodiment 1.

FIG. 12A to FIG. 12B and FIG. 13A to FIG. 13B illustrate an algorithm to increase optical fibers of Embodiment 1. FIG. 12A to FIG. 12B illustrates an algorithm to increase output optical fibers. FIG. 13A to FIG. 13B illustrate an algorithm to increase input optical fibers. It is assumed that a request is generated to newly increase an optical fiber link 5 and an optical fiber link 6. FIG. 12A shows a stage to determine whether to connect the newly-increased fifth output optical fiber from the fifth WSS to a coupler of any of the opposing input optical fibers. The determination for whether the internal path is connected is based on is made based on a condition that the usage rates of the respective opposing input optical fibers are lower than "90% of the threshold value". Regarding the existing first input optical fiber, the usage rate is 90% and thus the connection condition of "lower than 90% of the threshold value" is not satisfied. Thus, no connection is made between the fifth increase output optical fiber and the first input optical fiber. The existing second input optical fibers also does not satisfy the connection condition of "lower than 90% of the threshold value" and thus no connection is performed. Regarding the existing third and fourth input optical fibers having the usage rates of 76% and 72% on the other hand, these input optical fibers satisfy the connection condition of "lower than 90% of the threshold value". Thus, the internal paths to the fifth increase output optical fiber and the third and fourth input optical fibers are connected. Regarding the new fifth increased input optical fiber, it means the connection to the same target node B and thus there is no meaning to provide the routing from the node B to the node B, thus performing no connection. The new sixth increased input optical fiber has a usage rate of 0% and thus satisfies the connection condition of "lower than 90% of the threshold value", thus performing the connection. The result is that three internal paths 120 from the fifth WSS are used to perform the connection to the three input optical fibers.

FIG. 12B illustrates a stage to determine whether the new sixth increased output optical fiber is connected from the sixth WSS to the optical coupler of any of the opposing input optical fibers. The sixth increased output optical fibers is also determined, as in the fifth one, based on the usage rate of the input optical fibers. As a result, the determination is made for the connection from the sixth WSS via the three internal wirings (internal paths) 121 to the third and fourth existing input optical fibers and the fifth increased input optical fibers.

FIG. 13A shows a stage to determine whether to connect the new fifth increased input optical fibers from the fifth coupler to the WSS of any of the opposing output optical fibers. The algorithm to determine the connection of input optical fibers is totally the same as the case of output optical fibers. Regarding the existing first output optical fiber, the usage rate is 90%, which does not satisfy the connection condition of "lower than 90% of the threshold value" and thus no connection is made between the fifth increased input optical fiber and the first output optical fiber. The existing second output optical fiber also does not satisfy the connection condition of "lower than 90% of the threshold value" and thus no connection is performed. Regarding the existing third and fourth output optical fibers on the other hand, the usage rates are 76% and 72%, respectively, and thus satisfy the connection condition of "lower than 90% of the threshold value". Thus, the internal path from the fifth increase input optical fiber to the third and fourth output optical fibers is connected. Regarding the new fifth increased input optical fiber, the connection between the same target nodes B causes a wasteful path and thus no internal connection is performed. The new sixth increased input optical fiber has the usage rate of 0% and thus satisfies the connection condition of "lower than 90% of the threshold value" and the connection is performed. The result is that three internal wirings (internal paths) 130 from the fifth optical coupler are used to determine the connection to three output optical fibers. A part of the connection is already performed in the step of FIG. 12B.

FIG. 13B shows a stage to determine whether to connect the new sixth increased input optical fiber via the sixth coupler to the WSS of any of the opposing output optical fibers. The sixth increased input optical fiber is determined, as in the case of the fifth one, based on the usage rate of the opposing output optical fiber. The result is that three internal wirings (internal paths) 131 from the sixth optical coupler are used to determine the connection of the third and fourth existing output optical fibers and the fifth increases output optical fibers. Although not shown in the above example, when two pairs of optical fibers (the total of four optical fibers composed of two input optical fibers and two output optical fibers) are simultaneously added to one adjacent node, the WSSs of the same added adjacent nodes are not connected to the optical couplers. The reason is that two pairs of optical fibers to the node B for example are connected to the center node A and these fibers are used to provide the internal connection between the input and the output. This results in the path of B→A→B and such a routing is meaningless.

As described above, according to the OXC device of this disclosure, the determination for the connection of an additional WSS or the output port of the coupler is connected by the optical fiber and the internal path at an opposite side of any of the input port side or the output port side of the device to which the WSS or the coupler added is determined based on the usage statuses at the respective opposing optical fibers.

As described in FIG. 12A to FIG. 12B and FIG. 13A to FIG. 13B, regarding the newly-increased optical fibers, a very simple algorithm may be applied to the input-side optical fibers and the output-side optical fibers based on the usage rate of the optical fibers at an opposing side as a connection target. There may be a case where the input optical fiber and the output optical fiber at the same adjacent node have differed usage rates due to some reasons. The traffic amount also may be different depending on the UP fiber and the DOWN fiber. Thus, there may be a case where, with regard to a value close to a threshold value (e.g., 90%), it is determined that the connection is possible in one (e.g., 87%) while the connection is impossible in the other direction (e.g., 91%). Even in such a case, a rule to determine whether the internal path is connected may be appropriately determined. It is important that the algorithm to determine whether the internal path is connected in the OXC device of Embodiment 1 can be performed only based on a very-simple condition, i.e., the usage rate of the optical fiber. Thus, the above-described algorithm can be changed in various manners and is not limited to the above-described ones of FIG. 12A to FIG. 12B and FIG. 13A to FIG. 13B.

The algorithm for the determination of the internal connection of the OXC device based on the usage rate of the optical fiber of Embodiment 1 is valid regardless of the node degree $D_N$ or the degree $D_W$ of WSS. Furthermore, this algorithm is not limited to a symmetric configuration used as an assumption in the network configurations of FIG. 8A and FIG. 11 in which the OXC device has an equal number of input ports and output ports. Specifically, the algorithm also can be applied to a case where the number of input optical fibers is different from that of output optical fibers at a certain point of time and a case where different numbers of input optical fibers and output optical fibers are added in the increase stage. In such a case, depending on the number of input optical fibers and the number of output light output fibers, the number of WSSs also may be different from the number of couplers. In the above description, the connection between the center node and adjacent nodes is performed based on a pair of "input optical fiber" and "output optical fiber". However, UP and DOWN signals also can be transmitted through one optical fiber. Even in such a case, the OXC device of this disclosure can be applied by using a light circulator configured so that the bidirectional communication is performed through one optical fiber.

Furthermore, the above description has been made based on an assumption that the WSS port number (WSS degree $D_W$) is equal to the ramification number of the optical coupler. However, the feature of the OXC device of this disclosure is not lost even when these numbers are different. In summary, the OXC device of this disclosure has a characteristic that does not exist in the conventional technique that the OXC device is expanded while sequentially adding small-scale WSSs and all "input optical fibers" and "output optical fibers" are not internally connected to each other. Thus, the invention should not be interpreted in a manner limited only to the examples described for FIG. 12A to FIG. 12B and FIG. 13A to FIG. 13B.

Figure 4A:
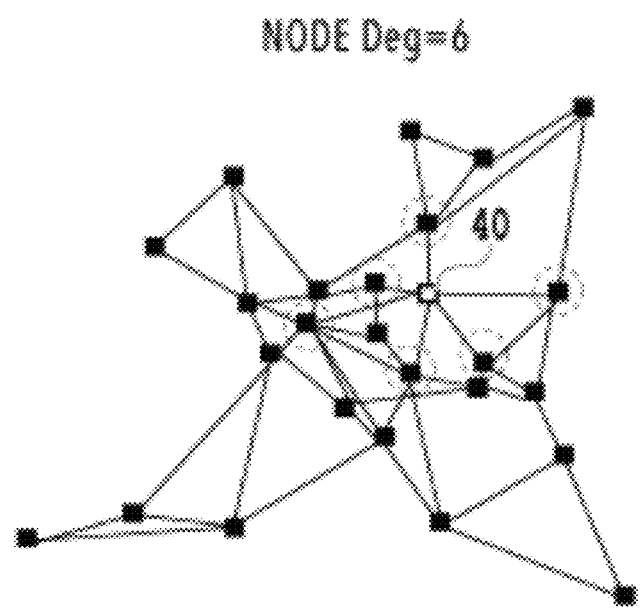
FIG. 4A illustrates an example of the geographic layout of an optical network.

The above-described configuration of the OXC device of this disclosure can be more specifically defined as described below, with regard to the configuration of the WSS used in particular, using the node degree, the fiber degree, and the WSS degree. As described for FIG. 4A, the number of adjacent nodes directly connected, at a certain node, via the transmission link is defined as the node degree ($D_N$). As described above for FIG. 6C, the WSS having a 1×n configuration including one input (output) port and n output (input) ports has the port number n at the side of a plurality of ports that is defined as the WSS degree ($D_W$). As described above for FIG. 7B, when assuming that a pair of UP optical fibers and DOWN optical fibers is one fiber link, the number of $N_{Pair}$ of fiber links (fiber pairs) between specific nodes is defined as the fiber degree ($D_F$).

With reference again to the network surrounding the OXC device of FIG. 8A, the center node A at which a target OXC device is provided is surrounded by four adjacent nodes B to E. These node numbers are denoted as node B=1, node C=2, node D=3, and node E=4 for simplicity. Based on the above-described definitions, the center node A has the node degree ($D_N$) of 4. Under the network configuration of FIG. 8A, the upper limit value of the WSS port numbers used in the OXC device of this disclosure is determined in the manner as described below.

The center node A and the respective adjacent nodes have therebetween the fiber pair number $N_{Pair,j}$ (j=1, 2, 3, and 4: node number), In FIG. 8A, the node B(j=1) is connected to the center node A via three fiber pairs, thus resulting in $N_{Pair,1}$=3. Similarly, when calculating the fiber pair number for the node C(j=2), the node D(j=3), and the node E(j=4), four adjacent nodes have the fiber pair numbers of $N_{Pair,1}$=3, $N_{Pair,2}$=5, $N_{Pair,3}$=4, and $N_{Pair,4}$=2, respectively.

Here, attention is paid on one adjacent node of the four adjacent nodes of the center node A. The following section will consider the total $N_{Total,j}$ of the fiber pair number $N_{Pair,j}$ between the other 3(=4−1) adjacent nodes other than this adjacent node and the center node A. For example, the total $N_{Total,2}$ of the fiber pair number of the adjacent node C (node number j=2) is obtained by obtaining the sum of the respective fiber pair numbers $N_{Pair,1}$, $N_{Pair,3}$, and $N_{Pair,4}$ of the three adjacent node B(j=1), node D(j=3), and node E(j=4) except for the adjacent node C (i.e., $N_{Total,2}$=3+4+2=9). Similarly, for all of the adjacent nodes (j=1, 2, 3, and 4), the total $N_{Total,j}$ of the fiber pair number NP air, j between the other adjacent nodes except for this adjacent node and the center node is calculated as shown below. In the following formulas, the representation j≠1 in the total sum sign Σ for the formula (2) for example means to exclude the adjacent node having the node number 1.

$$N_{Total,1} = \sum_{j \neq 1} N_{Pair,j} = 5 + 4 + 2 = 11 \quad \text{Formula (2)}$$
adjacent node $B(j = 1)$ $$N_{Total,2} = \sum_{j \neq 2} N_{Pair,j} = 3 + 4 + 2 = 9 \quad \text{Formula (3)}$$
adjacent node $C(j = 2)$ $$N_{Total,3} = \sum_{j \neq 3} N_{Pair,j} = 3 + 5 + 2 = 10 \quad \text{Formula (4)}$$
adjacent node $D(j = 3)$ $$N_{Total,4} = \sum_{j \neq 4} N_{Pair,j} = 3 + 5 + 4 = 12 \quad \text{Formula (5)}$$
adjacent node $E(j = 4)$ The WSS (WSS degree $D_W$) used in the OXC device of this disclosure satisfies the following formula when assuming that $N_{Total,j}$ of all adjacent nodes has the maximum value $N_{Max}$.

$$N_{Max} > D_W \quad \text{Formula (6)}$$

The WSS used in the OXC device of this disclosure generally has a 1×$N_{WSS}$ configuration (i.e., WSS degree $D_W$). Thus, the output port number $N_{WSS}$ (=$D_W$) of the WSS may satisfy the following formula.

$$N_{Max} > N_{WSS} \quad \text{Formula (7)}$$

In the case of the center node A in the status of the above-described network configuration of FIG. 8A, the formulae (2) to (5) can be used to calculate the maximum value $N_{Max}$ in $N_{Total,j}$ is 12 at the adjacent node E. Thus, in the OXC device provided at the center node A of FIG. 8A, the WSS having a configuration satisfying 12>$N_{WSS}$ based on the formula (7) may be used. Specifically, the WSS having the maximum output port number up to $N_{WSS}$=11 may be used. This WSS maximum port number $N_{wss}$ (which corresponds to the WSS degree $D_W$) is determined by the above-described procedure under a condition that the center node A shown in FIG. 8A at a certain point of time has four adjacent nodes (node degree $D_N$=4) and the center node A and the respective adjacent nodes have therebetween the specific fiber pair number $N_{Pair}$. Conversely, when the center node at which the target OXC device is provided has the number of adjacent nodes estimated in advance and when the maximum number of fiber links can be predicted or determined, the WSS maximum configuration to be used can be determined in advance. The OXC device of this disclosure can use the WSS having the minimum scale to thereby realize an extremely low cost OXC device. Even when the WSS scale is expanded to the maximum configuration defined by the formula (7) as described above, the feature of the OXC device of this disclosure can be provided that provides a low cost and the flexible expansibility of the OXC device.

Figure 14:
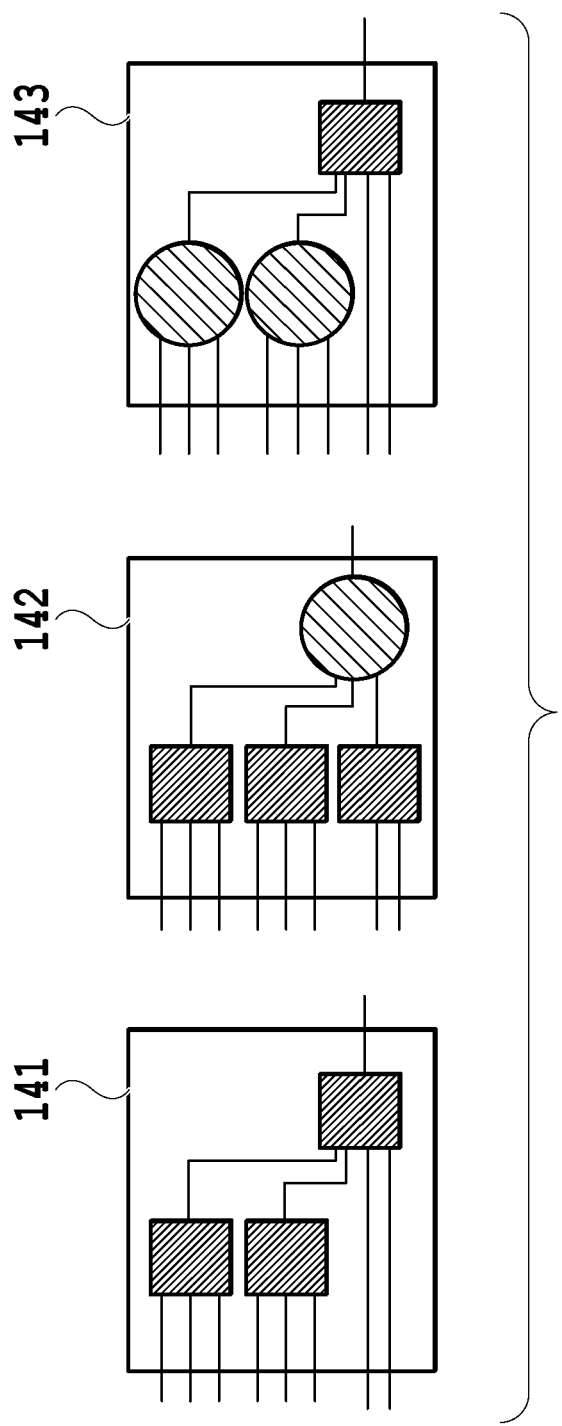
FIG. 14 illustrates a specific configuration of a cascade-type WSS that can be used in the OXC device of this disclosure.

FIG. 14 illustrates a specific configuration of the WSS that can be used in the OXC device of this disclosure. As has been shown in FIG. 5B, a small WSS having a small port number can be cascade-connected in order to increase the number of ports at a plurality of ports of the WSS. The WSS also can be configured by combining a coupler and the WSS. In FIG. 14, the WSS can be realized by cascade-connecting the WSS 141 having a configuration in which small-scale WSSs are cascade-connected, the coupler from the input side, and the WSS in this order. The cascade connection-type WSSs 141 and 142 function as a WSS that can select, from among an input including a plurality of optical signals having different wavelengths, an optical signal having one wavelength for an arbitrary one output port to output the signal. Thus, the WSSs 141 and 142 having the above-described cascade-type configuration can be applied to the OXC device of this disclosure having the route & combine-type configuration shown in FIG. 8B in which only one of the input side or the output side of OXC device has the WSS or the broadcast & select-type configuration shown in FIG. 11, FIG. 12A to FIG. 12B, and FIG. 12A to FIG. 12B. The OXC device of this disclosure can use the WSS having the minimum scale to thereby reduce the cost of the entire device. However, the WSS configuration method and cost may change in the future. The cross talk issue described for FIG. 6C also may be mitigated. Thus, it cannot be said that the cascade connection WSS having various configurations as shown in FIG. 14 cannot be used.

Figure 4B:
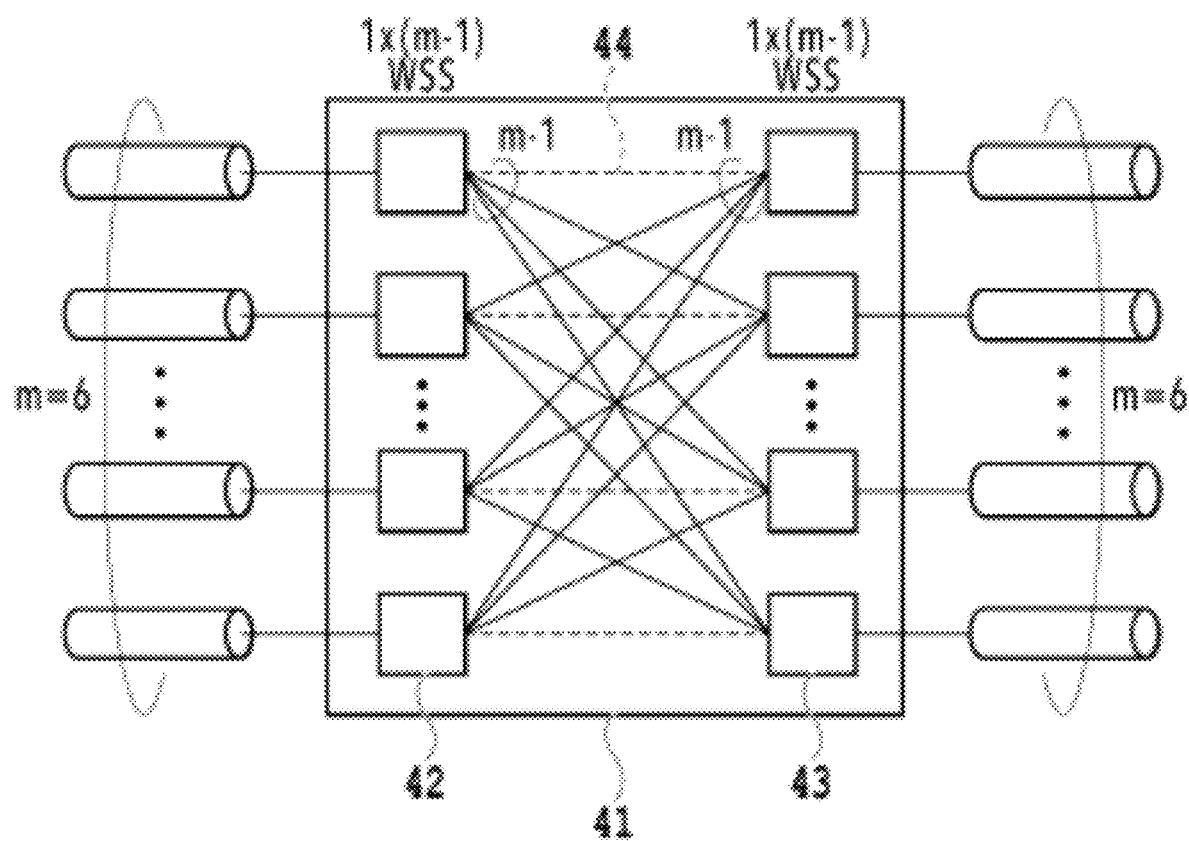
FIG. 4B illustrates the configuration of the OXC device of the prior art provided at a center node in an actual network.
Figure 15:
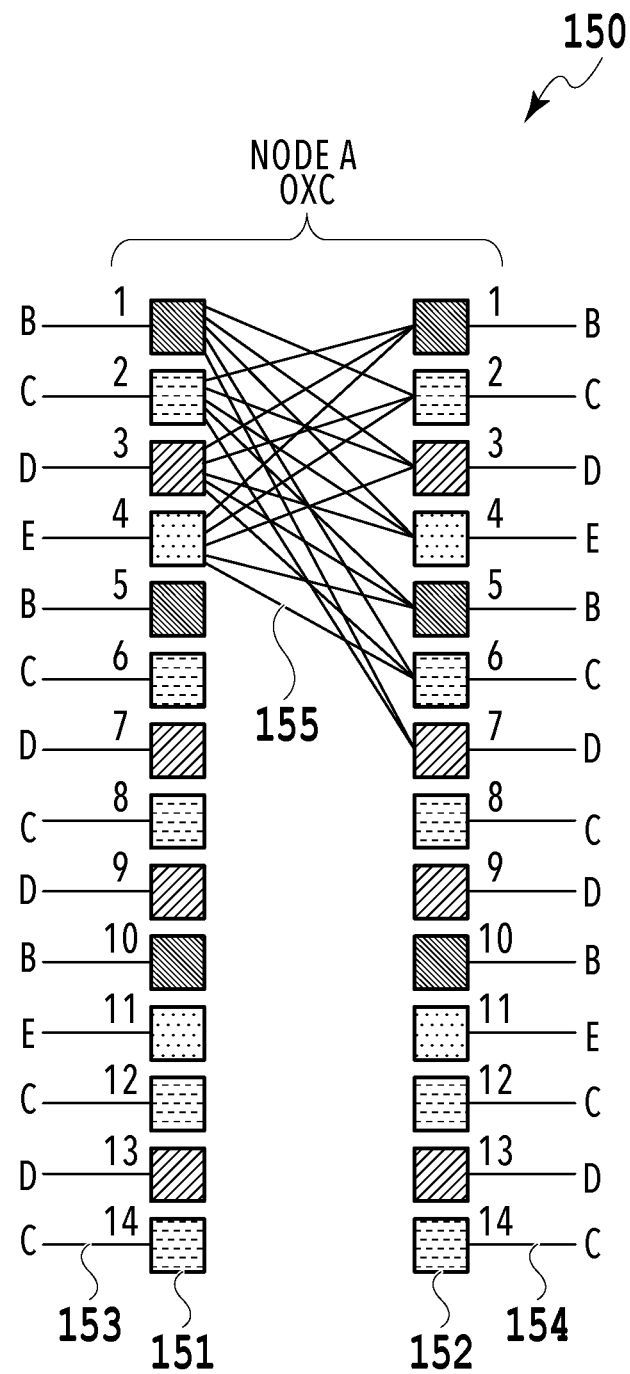
FIG. 15 illustrates an example of the route & select-type configuration of the OXC device of this disclosure.

FIG. 15 illustrates the route & select-type configuration example of the OXC device of this disclosure. The OXC device 150 is configured so that WSSs 151 and 152 are provided at both of the input side connected to the input optical fibers 153 and the output side connected to the output optical fiber 154. The WSSs at both sides are connected by the internal connection 155 based on the procedure described for FIG. 9A to FIG. 9B, FIG. 10A to FIG. 10B or FIG. 12A to FIG. 12B, and FIG. 13A to FIG. 13B. The OXC device of this disclosure of FIG. 15 corresponds to the route & select-type configuration of the conventional technique shown in FIG. 4B and FIG. 5B. As in the above-described route & combine-type configuration of FIG. 8B and the broadcast & select-type configuration of FIG. 11, FIG. 12A to FIG. 12B, and FIG. 12A to FIG. 12B, the feature of the OXC device of this disclosure using a small-scale WSS also can be applied to the route & select-type OXC device of FIG. 15.

In the case of the route & select-type configuration shown in FIG. 15, WSSs are provided at both of the input side and the output side of the OXC device. Thus, the WSS at one side can be substituted with a coupler. In such a case, the WSS 151 or the WSS 152 in the OXC device of FIG. 15 can be realized by the WSS 143 having the configuration as shown at the right side of FIG. 14 in which the input side, the WSS, and the coupler are cascade-connected in this order. In the cascade-connected WSS 143 of FIG. 14, there is no wavelength selectivity between output ports from one coupler. Thus, the WSS 143 cannot be called as a complete WSS in a strict sense. However, when such a WSS that includes the wavelength selectivity at a part of an output port is also included as the WSS, the cascade-connected WSS 143 also can be applied to one of the input side or the output side of the OXC device of this disclosure shown in FIG. 15. As described above, the OXC device of this disclosure is configured so that a plurality of WSS provided at a plurality of output ports or at a plurality of input ports can respectively have the configuration 142 obtained by cascade-connecting a plurality of WSSs having a smaller number of output ports than $N_{WSS}$ or the configuration 142 obtained by cascade-connecting a coupler and the branch output of the coupler to a plurality of WSSs having a smaller number of output ports than $N_{WSS}$.

Figure 16:
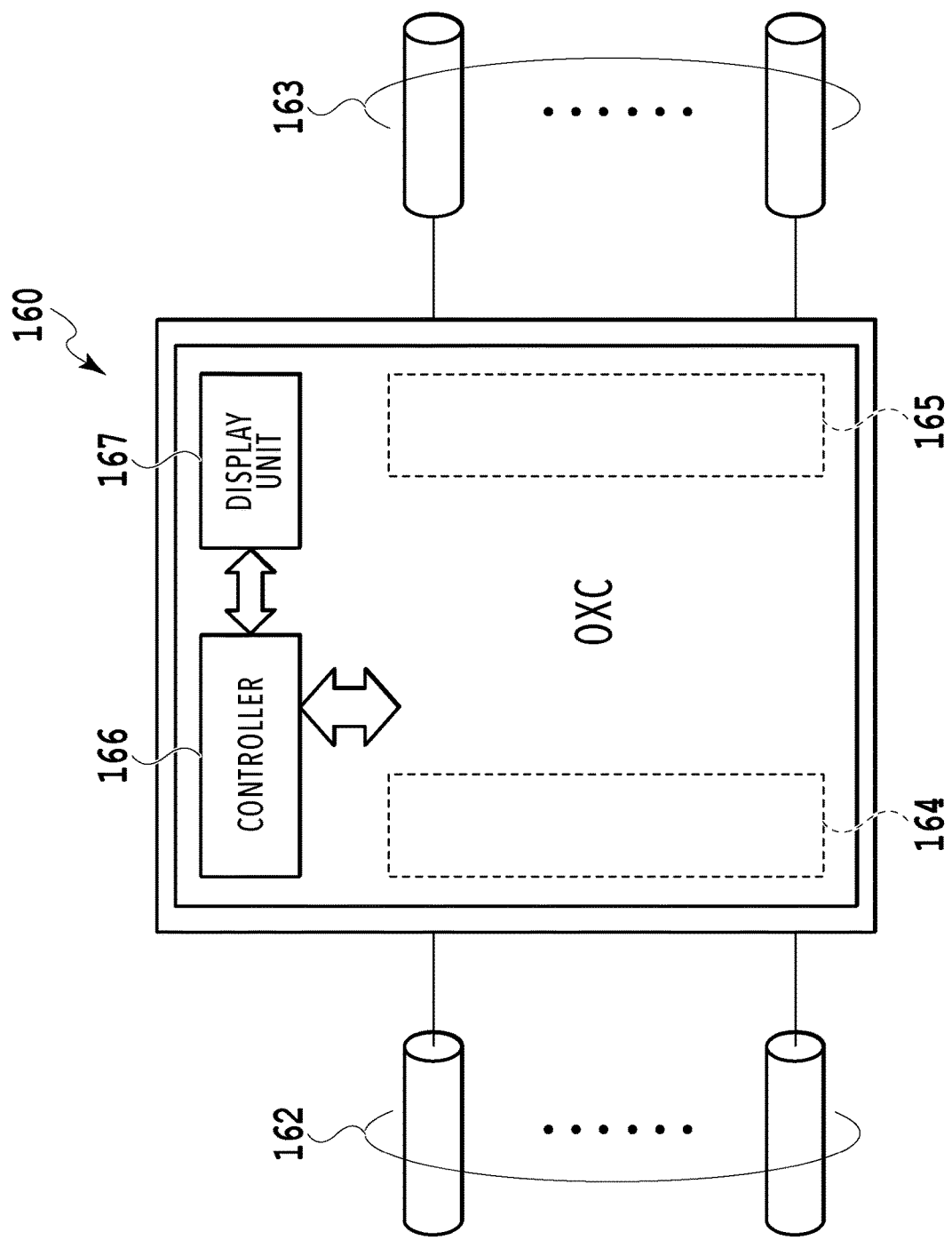
FIG. 16 illustrates the outline of the control in the OXC device of this disclosure.

FIG. 16 shows the outline of the control in the OXC device of this disclosure. The OXC device of this disclosure 160 includes an input-side WSS or a coupler 164 connected to the input optical fiber 162 and an output-side WSS or coupler 165 connected to the output optical fiber 163. As in the OXC device of the prior art, a controller 166 can be provided that sets these components and controls the operation or that controls the entire device. Although FIG. 16 shows the controller 166 as being within the OXC device, the controller 166 also may be provided at the exterior of the OXC device or may be remote-controlled by another device via a network, or may be cooperatively controlled by a plurality of controllers provided at the interior or the exterior of the OXC device in a distributed manner. The controller 166 can include a central processing unit (CPU) or a memory for example.

The controller 166 can generate information for the usage rate or the usage status of optical fibers or the amount of the traffic with the respective adjacent nodes based on a measurement value or a set value for example. The controller 166 also can receive these pieces of information from the exterior of the OXC device. Based on these pieces of information, a signal, display or information cam ne generated that shows the need for the increase of optical fibers or a coupler or WSS. Furthermore, these pieces of information and a signal can be displayed by a display unit 167. The display unit 167 may be a display device or an LED lamp or may be audio notification. The display unit 167 can include any device or component that can display information showing the need of the increase of the OXC device such as the usage rate of the optical fibers, the usage status, or the traffic amount. The controller 166 and the display unit 167 as described above can be provided in any OXC device regardless of the configuration of the OXC device such as the route & combine-type configuration, the broadcast & select-type configuration, or the route & select-type configuration.

Figure 17:
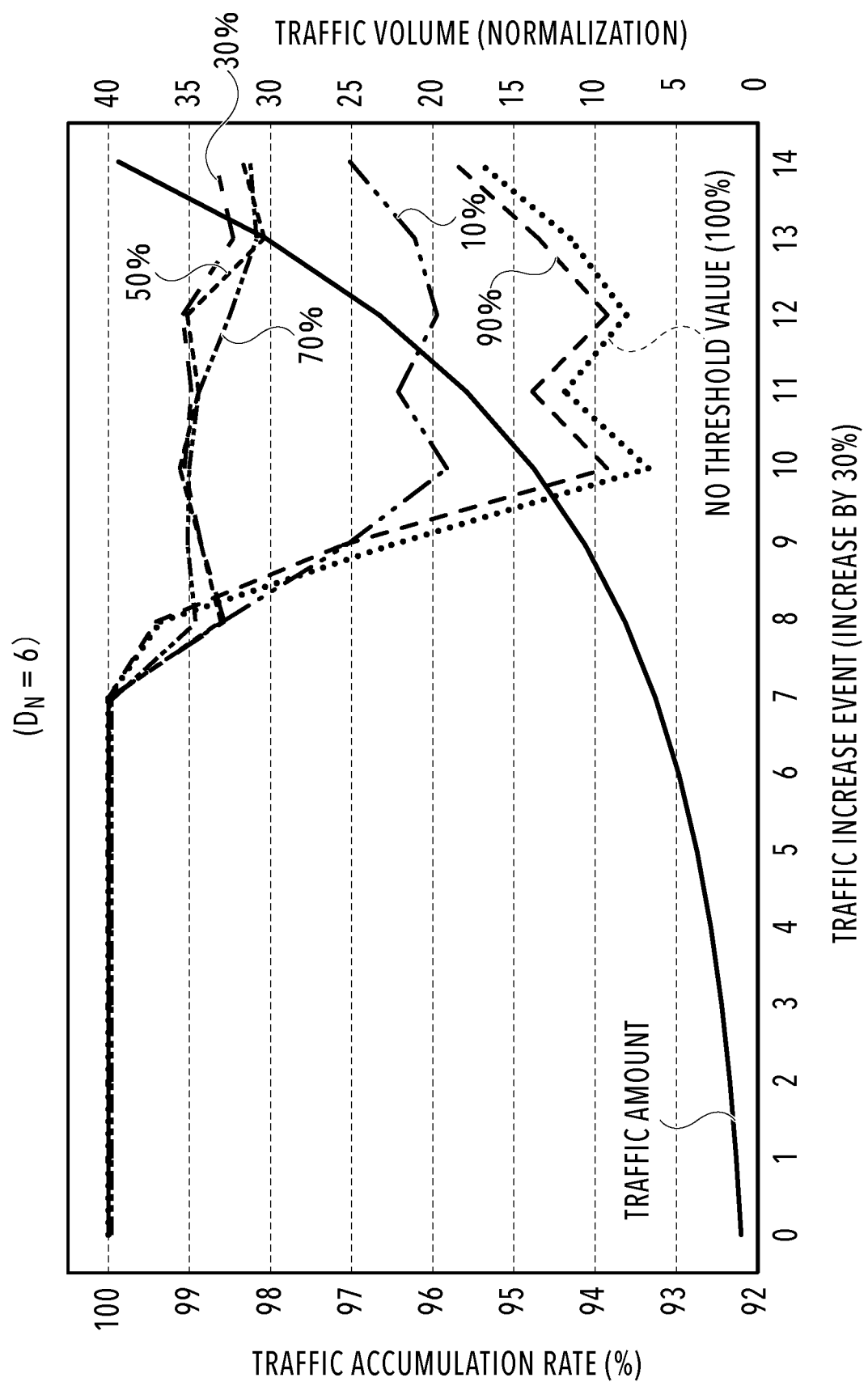
FIG. 17 illustrates the relation between the threshold value setting of the usage rate of the optical fibers and a traffic accumulation rate in the OXC device of Embodiment 1.

FIG. 17 shows the relation between the set threshold value of the usage rate of optical fibers and the traffic accumulation rate for the determination of the connection of the internal path in the OXC device of this embodiment. FIG. 17 shows the simulation result when the node degree $D_N=6$ is established and six adjacent nodes are used. In FIG. 17, the horizontal axis shows a traffic increase event. This traffic increase event typically shows that the total traffic amount passing through the center node in the simulation increases with time as shown by the curve of the solid line. Thus, the horizontal axis may be considered as representing time. Specifically, the traffic amount is increased by 30% for each event in the simulation. With this rate of increase, at the stage at which 14 events (unit time) are exceeded as shown by the vertical axis shown at the right side, the traffic volume will be 40 times higher than the original amount (event 0).

In FIG. 17, the vertical axis the traffic accumulation rate (%) in the OXC device of this disclosure. In the simulation, when each traffic event (events 1 to 14) occurs, determination is made as to whether to increase optical fibers and to add the WSS and the coupler within the device with regard to the initial configuration at the introduction of the OXC. While expanding the OXC device using the increase algorithm of the usage rate of the optical fibers described for FIG. 11 and FIG. 12A to FIG. 12B, the threshold value of the usage rate of the optical fibers are used as parameters to simulate and calculate the traffic accumulation rate.

The traffic accumulation rate is calculated as described below. In order to process the traffic amount corresponding to each event, the network configuration is calculated in the case where paths are formed to all output ports of the WSS at an opposing side of the WSS in the conventional technique. Specifically, the input port number and the output port number of the OXC device are determined. In the case of the configuration of the conventional technique, all optical fibers are mutually connected by WSS in a complete manner. Thus, no contention is caused when a path is set and a path can be always routed so long as the transmission capacity of optical fibers is exceeded.

Next, the maximum processable traffic amount is calculated when the OXC device of this disclosure is configured by the same input port number and the same output port number as those of the network configuration of the conventional technique. In this case, when the OXC device of this disclosure can accommodate only 96% of the traffic amount of the conventional technique, then the traffic accumulation rate is 96%. In summary, how much traffic can be handled by the OXC device of this disclosure as an optical switch in the traffic accumulation rate shows the OXC device of this disclosure having an input/output port configuration similar to the configuration of the conventional technique. Thus, when the accumulation rate is 100%, it means a traffic accommodation capability totally equal to that of the conventional technique, showing no deterioration of the performance of the optical switch when compared with the conventional technique.

FIG. 17 shows how the calculation value of the traffic accumulation rate changes when the increase algorithm of Embodiment 1 when the threshold value of the usage rate of optical fibers is changed from 10, through 30, 50, 70, and 90 to 100%. When the threshold value is 100%, it is equivalent to the case where no threshold value is set. Until the stage of the traffic event 7 is reached, the accumulation rate is maintained at 100% at any threshold value. This shows that the traffic amount is small until the traffic event 7 is reached. Thus, the initial configuration used in the simulation (the configuration in which pairs of link fibers of adjacent nodes are all connected to the OXC device). At the stage after the traffic event 8, the threshold value be set within a range from 30% to 70% allows the OXC device of this disclosure to maintain the accumulation rate of 98% or more when compared with the configuration of the conventional technique. The OXC device of this disclosure is configured so that WSSs are connected in a limitless manner and all WSS output ports are mutually connected. When compared with the conventional technique free from the contention during the path setting, the OXC device of this disclosure provides an optical switch having a similar performance.

Figure 18:
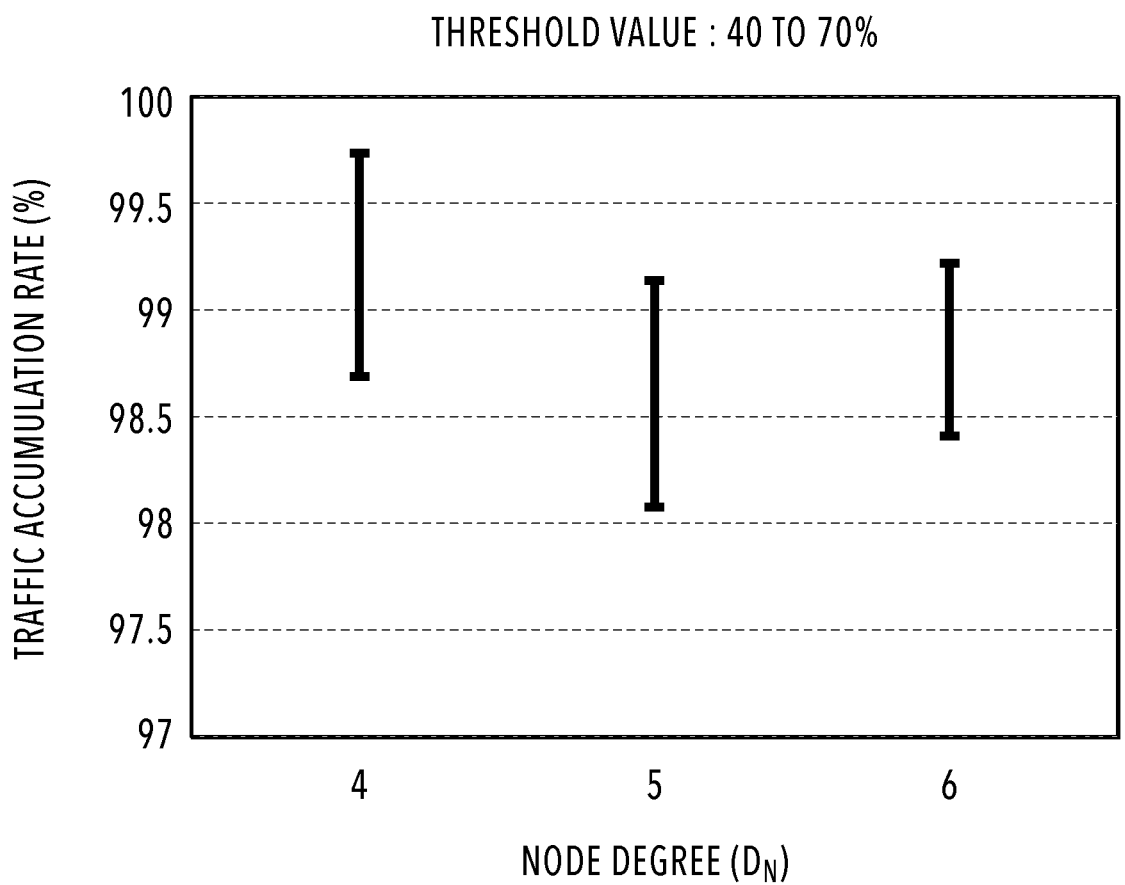
FIG. 18 shows how the traffic accumulation rate changes depending on the number of adjacent nodes in the OXC device of this disclosure.

FIG. 18 shows how the traffic accumulation rate changes depending on the number of adjacent nodes (node degree $D_N$) in the OXC device of this disclosure. The simulation shown in FIG. 17 shows the highest value and the lowest value of the traffic accumulation rate during the traffic increase events 8 to 14 when the threshold values of the usage rate of the optical fibers in the increase algorithm are set within a range of 40 to 70% within which a favorable traffic accumulation rate is obtained. It can be confirmed that, when the OXC device of this disclosure is compared with the OXC device of the prior art, the OXC device of this disclosure can suppress the deterioration of the traffic accumulation rate to about 2% at maximum even when the node degree $D_N$ is changed.

FIG. 19 shows the comparison between the OXC device of this disclosure and OXC devices with the conventional technique with regard to the number of WSSs required within the device in the final status of the increase simulation calculation. In the increase simulation calculation shown in FIG. 17 and FIG. 18, at the stage at which the $14^{th}$ traffic increase event is completed, the number of WSSs in the device having the final status was calculated for different node degrees ($D_N$=4 to 6). In FIG. 19, the vertical axis at the right side shows the average optical fiber logarithm per one link between one adjacent node and the center node.

The OXC device of the prior art is configured so that WSSs are connected limitlessly and all output ports of the WSS are mutually connected. Regarding such an OXC device of the prior art, a case where a node is configured by the WSS having a 1×9 configuration and a case where a node is configured by the WSS having a 1×20 configuration are shown. In the case of the configuration of the conventional technique, in any of these cases, an increase of the node degree causes the rapid increase of the number of required WSSs. For example, when the node degree $D_N$=6, the number of WSSs required in the configuration of the conventional technique using the WSS having a 1×9 configuration exceeds 300. On the other hand, in the case of the OXC device of this disclosure, even when the WSS having a very small scale is used such as the one having a 1×5 configuration, the number of required WSSs is a few times or 10 times smaller than that in the case of the conventional technique. Thus, a much smaller number of WSSs is required. Thus, when the OXC device of this disclosure is compared with the conventional technique, the former can suppress the reduction of the traffic accumulation rate to about 2% at maximum and requires expensive WSS in the number ⅒ smaller than that of required in the conventional technique and may require low-cost and small-scale WSSs. Thus, the cost for the OXC device can be reduced remarkably than in the case of the conventional technique.

As has been described in detail, many advantage can be obtained by using the configuration of the OXC device of this disclosure to use an algorithm to determine the connection of the internal path of the OXC device based on the usage rate of optical fibers to increase optical fibers and to expand WSSs. The configuration of the OXC device of this disclosure provides a WSS having a smaller scale and a simpler configuration than in the case of the conventional technique. This can consequently provide a simpler extension work, a remarkably-lower cost of the initial introduction, and the scalability providing the flexible expansion depending on the traffic amount, thus providing the device requiring a significantly-lower cost. A very small decrease of the traffic accumulation rate due to the limitation on the connection of the internal path to optical fibers at an opposing side of the WSS is no problem at all by increasing the optical fibers at an appropriate timing.

Embodiment 2

Figure 20:
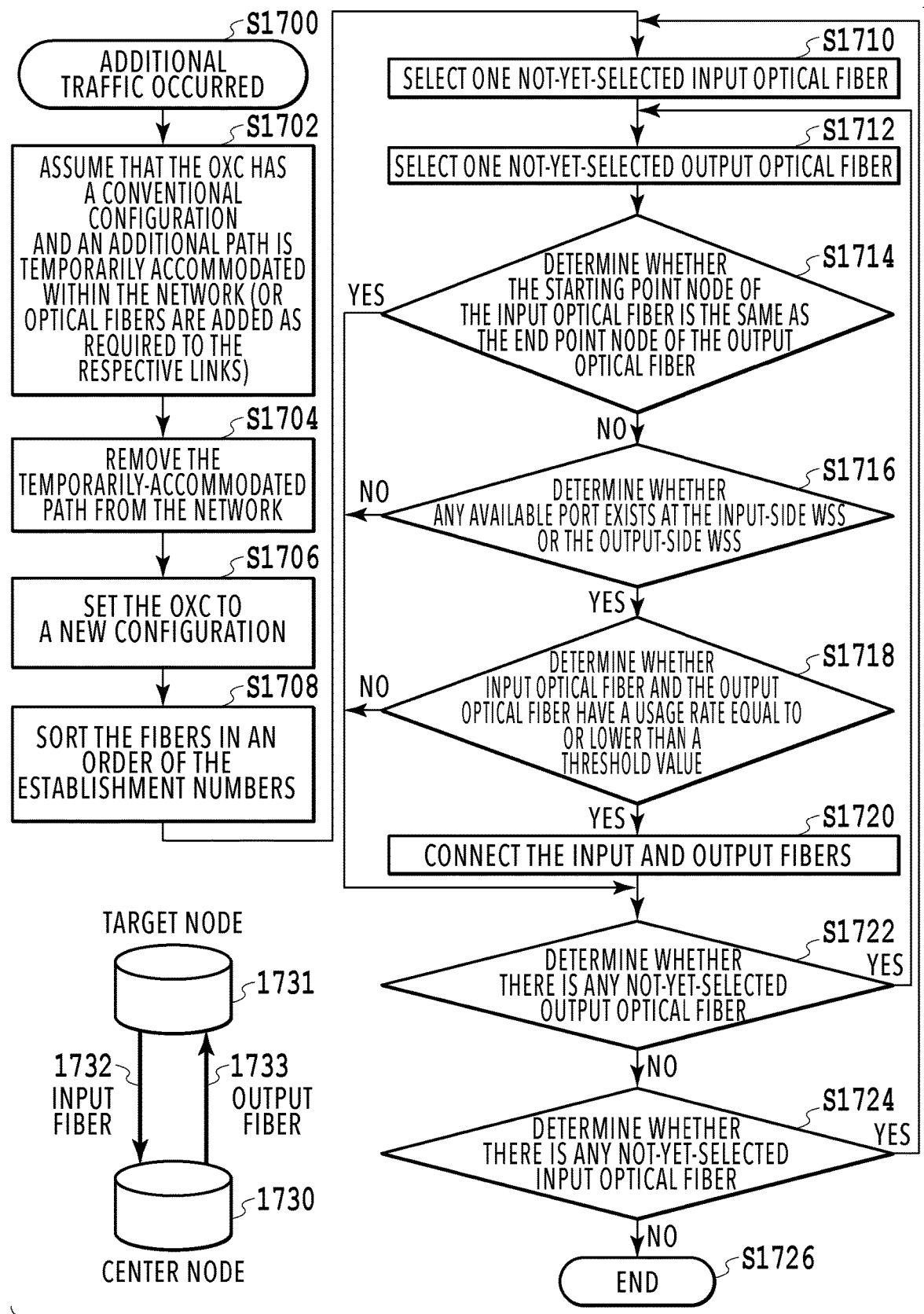
FIG. 20 illustrates an algorithm to connect new optical fibers Embodiment 2 in the OXC device of this disclosure.

FIG. 20 shows an algorithm to increase new optical fibers of Embodiment 2 in the OXC device to connect the fibers in the OXC device. In a process of connecting the center node 1730 to the target node 1731 by an input optical fiber 1732 and an output optical fiber 1733, optical fibers are added from the initial status. The reference numeral S denotes a step.

S1700: Additional traffic occurred.
S1702: Assume that the OXC has a conventional configuration and an additional path is temporarily accommodated within the network (or optical fibers are added as required to the respective links).
S1704: Remove the temporarily-accommodated path from the network.
S1706: Set the OXC to a new configuration.
S1707: Sort the optical fibers in an order of the establishment numbers.
S1710: Select one not-yet-selected input optical fiber.
S1712: Select one not-yet-selected output optical fiber.
S1714: Determine the starting point node of the input optical fiber is the same as the end point node of the output optical fiber.
S1716: Determines whether any available port exists at the input-side WSS or the output-side WSS.
S1718: Determine whether input optical fiber and the output optical fiber have a usage rate equal to or lower than a threshold value.
S1720: Connect the input and output fibers.
S1722: Determine whether there is any not-yet-selected output optical fiber.
S1724: Determine whether there is any not-yet-selected input optical fiber.
S1726: Complete the procedure.

The above-described procedures merely show one example of an algorithm to provide the connection within the OXC device. Thus, various modifications can be made. The above procedures also can be carried out as an invention of a method of increasing new optical fibers in the OXC device.

As described above, this disclosure includes the following OXC device.

[Item 1]
An optical cross-connect (OXC) device, comprising: a plurality of input ports connected to a plurality of input optical fibers and a plurality of output ports connected to a plurality of output optical fibers. The OXC device is mutually connected via the plurality of input optical fibers and the plurality of output optical fibers to N adjacent nodes (N is a natural number). A wavelength-multiplexed optical signal inputted to one of the plurality of input ports is wavelength-routed to any of the plurality of output ports. The OXC device comprises, at the side of the plurality of input ports, a plurality of wavelength selective switches (WSSs) having a $1 \times N_{WSS}$ configuration each of which has an input port connected to one of the plurality of input optical fibers and $N_{WSS}$ output ports. When assuming that, for one adjacent node j (j=1, 2 . . . , N), the number of a fiber pair consisting of one of the input optical fibers and one of the output optical fibers connected to the OXC device is $N_{Pair,j}$ (j=1, 2 . . . , N) and the total of the number of the fiber pairs between (N−1) adjacent nodes and the OXC device except for the one adjacent node j is $N_{Total, j}$, and the maximum value $N_{Max}$ of the $N_{Total, j}$ satisfies the relation of $N_{Max} > N_{WSS}$ for the respective N adjacent nodes.

[Item 2]
According to the optical cross-connect (OXC) device according to Item 1, the plurality of WSSs are configured so that the $N_{WSS}$ output ports of one WSS connected to one adjacent node are connected, via an internal path, only to some optical fibers of optical fibers connected to (N−1) adjacent nodes except for the one adjacent node among the plurality of output optical fibers.

[Item 3]
An optical cross-connect (OXC) device, comprising: a plurality of input ports connected to a plurality of input optical fibers and a plurality of output ports connected to a plurality of output optical fibers. The OXC device is mutually connected via the plurality of input optical fibers and the plurality of output optical fibers to N adjacent nodes (N is a natural number). A wavelength-multiplexed optical signal inputted to one of the plurality of input ports is wavelength-routed to any of the plurality of output ports. The OXC device comprises, at the side of the plurality of input ports, a plurality of wavelength selective switches (WSSs) having a $1 \times N_{WSS}$ configuration each of which has an input port connected to one of the plurality of input optical fibers and $N_{WSS}$ output ports. The plurality of WSSs are configured so that the $N_{WSS}$ output ports of one WSS connected to one adjacent node are connected, via an internal path, only to some optical fibers of optical fibers connected to (N−1) adjacent nodes except for the one adjacent node among the plurality of output optical fibers.

[Item 4]
An optical cross-connect (OXC) device, comprising: a plurality of input ports connected to a plurality of input optical fibers and a plurality of output ports connected to a plurality of output optical fibers. The OXC device is mutually connected via the plurality of input optical fibers and the plurality of output optical fibers to N adjacent nodes (N is a natural number). A wavelength-multiplexed optical signal inputted to one of the plurality of input ports is wavelength-routed to any of the plurality of output ports. The OXC device comprises, at the side of the plurality of output ports, a plurality of wavelength selective switches (WSS) having a $1 \times N_{WSS}$ configuration each of which has an input port connected to one of the plurality of output optical fibers and $N_{WSS}$ output ports. When assuming that, for one adjacent node j (j=1, 2 . . . , N) of the N adjacent nodes, the number of a fiber pair consisting of one of the input optical fibers and one of the output optical fibers connected to the OXC device is $N_{Pair,j}$ (j=1, 2 . . . , N) and the total of the number of the fiber pairs between (N−1) adjacent nodes and the OXC device except for the one adjacent node j is $N_{Total, j}$, and the maximum value NM ax of the $N_{Total, j}$ satisfies the relation of $N_{Max} > N_{WSS}$ for the respective N adjacent nodes.

[Item 5]
According to the optical cross-connect (OXC) device according to Item 4, the plurality of WSSs are configured so that the $N_{WSS}$ output ports of one WSS connected to one adjacent node are connected, via an internal path, only to some optical fibers of optical fibers connected to (N−1) adjacent nodes except for the one adjacent node among the plurality of input optical fibers.

[Item 6]
An optical cross-connect (OXC) device, comprising: a plurality of input ports connected to a plurality of input optical fibers and a plurality of output ports connected to a plurality of output optical fibers. The OXC device is mutually connected via the plurality of input optical fibers and the plurality of output optical fibers to N adjacent nodes (N is a natural number). A wavelength-multiplexed optical signal inputted to one of the plurality of input ports is wavelength-routed to any of the plurality of output ports. The OXC device comprises, at the side of the plurality of output ports, a plurality of wavelength selective switches (WSS) having a $1 \times N_{WSS}$ configuration each of which has an input port connected to one of the plurality of output optical fibers and $N_{WSS}$ output ports. The plurality of WSSs are configured so that the $N_{WSS}$ output ports of one WSS connected to one adjacent node are connected, via an internal path, only to some optical fibers of optical fibers connected to (N−1) adjacent nodes except for the one adjacent node among the plurality of input optical fibers.

[Item 7]
According to the optical cross-connect (OXC) device according to any one of Items 1 to 3, the OXC device comprises a route & combine-type configuration in which the OXC device comprises, at the side of the plurality of output ports, a plurality of couplers connected to the output ports of the plurality of WSSs via an internal path or a route & select-type configuration in which the OXC device further comprises, at the plurality of output ports, a plurality of WSSs having a $1 \times N_{WSS}$ configuration and the output ports of the WSSs at the respective sides are mutually connected via an internal path.

[Item 8]
According to the optical cross-connect (OXC) device according to any one of Items 4 to 6, the OXC device comprises a broadcast & select-type configuration in which the OXC device comprises, at the side of the plurality of input ports, a plurality of couplers connected to the output ports of the plurality of WSSs via an internal path or a route & select-type configuration in which the OXC device further comprises, at the side of the plurality of input ports, a plurality of WSSs having a $1 \times N_{WSS}$ configuration and the output ports of the WSSs at the respective sides are mutually connected via an internal path.

[Item 9]
According to the optical cross-connect (OXC) device according to any one of Items 1 to 8, the respective plurality of WSSs provided at the side of the plurality of output ports or the plurality of input ports comprises a configuration obtained by cascade-connecting a plurality of WSSs comprising output ports less than $N_{WSS}$ or a configuration obtained by cascade-connecting a coupler to a plurality of WSSs comprising output ports less than $N_{WSS}$ at the branch output of the coupler.

[Item 10]
According to the optical cross-connect (OXC) device according to Item 2, the OXC device further comprises a controller to output a signal depending on the usage status of the input optical fiber.

[Item 11]
According to the optical cross-connect (OXC) device according to Item 10, the OXC device further comprises a display unit to display, depending on the signal, the usage status of the input optical fiber.

[Item 12]
According to the optical cross-connect (OXC) device according to Item 5, the OXC device further comprises a controller to output a signal depending on the usage status of the output optical fiber.

[Item 13]
According to the optical cross-connect (OXC) device according to Item 12, the OXC device further comprises a display unit to display, depending on the signal, the usage status of the input optical fiber.

[Item 14]
According to the optical cross-connect (OXC) device according to Item 2, the OXC device further comprises a display unit to display that the usage status of the input optical fiber exceeds a threshold value.

[Item 15]
According to the optical cross-connect (OXC) device according to Item 5, the OXC device further comprises a display unit to display that the usage status of the output optical fiber exceeds a threshold value.

[Item 16]
According to the optical cross-connect (OXC) device according to any one of Items 11 to 13, the signal is outputted based on a ratio as the usage status comprising: a ratio between the maximum frequency band that can be allocated to target optical fibers and the sum of the currently-used light path bands; or a ratio between the number of light paths that can be accommodated in the target optical fibers and the number of the currently-used light paths.

[Item 17]
According to the optical cross-connect (OXC) device according to Item 16, the signal is outputted when the ratio is equal to or lower than a predetermined threshold value or is within a predetermined range of threshold value.

[Item 18]
According to the optical cross-connect (OXC) device according to any one of Items 1 to 7, the number of $N_{WSS}$ output ports of the plurality of WSSs is equal to or higher than N−1 (the number of the adjacent nodes N−1).

As described above, according to this disclosure, a large-scale OXC device is realized with a lower cost. At the same time, an OXC device is provided that has a configuration that can be flexibly expanded depending on an increase of the traffic and a method is provided to expand the device. When the configuration of the OXC device of this disclosure is used and an algorithm is used to determine the internal connection of the OXC device based on the usage rates of the respective optical fibers to increase optical fibers and to expand the WSS for example, a simpler configuration than in the case of the conventional technique can be achieved, thus providing a simple extension work. Furthermore, the initial introduction cost is remarkably reduced and the scalability providing the flexible expansion depending on the traffic amount is obtained, thus providing the OXC device requiring a significantly-lower cost.

INDUSTRIAL APPLICABILITY

This disclosure generally can be applied to a communication system. In particular, this disclosure can be applied to a cross-connect node of an optical communication system.

The invention claimed is:

1. An optical cross-connect (OXC) device, comprising: a plurality of input ports connected to a plurality of input optical fibers and a plurality of output ports connected to a plurality of output optical fibers, the OXC device is mutually connected via the plurality of input optical fibers and the plurality of output optical fibers to N adjacent nodes (N is a natural number), a wavelength-multiplexed optical signal inputted to one of the plurality of input ports is wavelength-routed to any of the plurality of output ports,
wherein: the OXC device comprises:
a plurality of input-side wavelength selective switches (WSS) individually connected to one of the plurality of input optical fibers; and
a plurality of output-side WSSs or a plurality of output-side couplers individually connected to one of the plurality of output optical fibers,
each of the plurality of input-side WSSs is connected to at least some of the plurality of output-side WSSs or the plurality of output-side couplers by one or more internal paths,
the plurality of input-side WSSs has a $1 \times N_{WSS}$ configuration having $N_{WSS}$ output ports, and
when assuming that, for one adjacent node j (j=1, 2 . . . , N) of the N adjacent nodes, the number of a fiber pair consisting of one of the input optical fibers and one of the output optical fibers connected to the OXC device is $N_{Pair,j}$ (j=1, 2 . . . , N) and the total of the number of the fiber pairs between (N−1) adjacent nodes and the OXC device except for the one adjacent node j is $N_{Total, j}$, the maximum value $N_{Max}$ of the $N_{Total,j}$ satisfies the relation of $N_{Max} > N_{WSS}$ for the respective N adjacent nodes, and
wherein the optical cross-connect device further comprises a controller for controlling signals depending on the usage statuses of the input optical fibers.

2. The optical cross-connect device according to claim 1, wherein: the number of $N_{WSS}$ output ports of the plurality of input-side WSSs is equal to or higher than (N−1).

3. The optical cross-connect device according to claim 1, wherein: the signal is outputted based on a ratio as the usage status comprising:
a ratio between the maximum frequency band that can be allocated to a target optical fiber and the total sum of the bands of the currently-used light paths; or
a ratio between the number of the light paths that can be stored in the target optical fiber and the number of the currently-used light paths.

4. The optical cross-connect device according to claim 3, wherein: the signal is outputted when the ratio is equal to or lower than a predetermined threshold value or within a predetermined range of threshold values.

5. An optical cross-connect (OCX) device, comprising:
a plurality of input ports connected to a plurality of input optical fibers and a plurality of output ports connected to a plurality of output optical fibers, the OXC device is mutually connected via the plurality of input optical fibers and the plurality of output optical fibers to N adjacent nodes (N is a natural number), a wavelength-multiplexed optical signal inputted to one of the plurality of input ports is wavelength-routed to any of the plurality of output ports, wherein: the OXC device comprises:
a plurality of input-side wavelength selective switches (WSS) individually connected to one of the plurality of input optical fibers; and
a plurality of output-side WSSs or a plurality of output-side couplers individually connected to one of the plurality of output optical fibers,
each of the plurality of input-side WSSs is connected to at least some of the plurality of output-side WSSs or the plurality of output-side couplers by one or more internal paths,
the plurality of input-side WSSs has a $1 \times N_{WSS}$ configuration having $N_{WSS}$ output ports, and
when, for one adjacent node j (j=1, 2 . . . , N) of the N adjacent nodes, the number of a fiber pair consisting of one of the input optical fibers and one of the output optical fibers connected to the OXC device is $N_{Pair,j}$ (j=1, 2 . . . , N) and the total of the number of the fiber pairs between (N−1) adjacent nodes and the OXC device except for the one adjacent node j is $N_{Total,j}$, the maximum value $N_{Max}$ of the $N_{Total,j}$ satisfies the relation of $N_{Max} > N_{WSS}$ for the respective N adjacent nodes, and
wherein the optical cross-connect device further comprises a controller to output a signal depending on the usage status of the output optical fiber.

6. The optical cross-connect device according to claim 5, wherein: the signal is outputted based on a ratio as the usage status comprising:
a ratio between the maximum frequency band that can be allocated to a target optical fiber and the total sum of the bands of the currently-used light paths; or
a ratio between the number of the light paths that can be stored in the target optical fiber and the number of the currently-used light paths.

7. The optical cross-connect device according to claim 6, wherein: the signal is outputted when the ratio is equal to or lower than a predetermined threshold value or within a predetermined range of threshold values.

8. An optical cross-connect (OXC) device, comprising: a plurality of input ports connected to a plurality of input optical fibers and a plurality of output ports connected to a plurality of output optical fibers, the OXC device is mutually connected via the plurality of input optical fibers and the plurality of output optical fibers to N adjacent nodes (N is a natural number), a wavelength-multiplexed optical signal inputted to one of the plurality of input ports is wavelength-routed to any of the plurality of output ports,
wherein: the OXC device comprises:
a plurality of input-side couplers individually connected to one of the plurality of input optical fibers; and
a plurality of output-side wavelength selective switches (WSS) individually connected to one of the plurality of output optical fibers,
each of the plurality of input-side couplers is connected to at least some of the plurality of output-side WSSs by one or more internal paths, and
the plurality of output-side WSSs has a $1 \times N_{WSS}$ configuration having $N_{WSS}$ output ports, and
when, for one adjacent node j (j=1, 2 . . . , N) of the N adjacent nodes, the number of a fiber pair consisting of one of the input optical fibers and one of the output optical fibers connected to the OXC device is $N_{Pair,j}$ (j=1, 2 . . . , N) and the total of the number of the fiber pairs between (N−1) adjacent nodes and the OXC device except for the one adjacent node j is $N_{Total,j}$, the maximum value $N_{Max}$ of the $N_{Total,j}$ satisfies the relation of $N_{Max} > N_{WSS}$ for the respective N adjacent nodes, and
wherein the optical cross-connect device further includes a controller for controlling signals depending on the usage statuses of the input optical fibers.

9. The optical cross-connect device according to claim 8, wherein: the number of $N_{WSS}$ output ports of the plurality of output-side WSSs is equal to or higher than (N−1).

10. The optical cross-connect device according to claim 8, wherein: the signal is outputted based on a ration as the usage status comprising:
a ratio between the maximum frequency band that can be allocated to a target optical fiber and the total sum of the bands of the currently-used light paths; or
a ratio between the number of the light paths that can be stored in the target optical fiber and the number of the currently-used light paths.

11. The optical cross-connect device according to claim 10, wherein: the signal is outputted when the ratio is equal to or lower than a predetermined threshold value or within a predetermined range of threshold values.

12. An optical cross-connect (OCX) device comprising:
a plurality of input ports connected to a plurality of input optical fibers and a plurality of output ports connected to a plurality of output optical fibers, the OXC device is mutually connected via the plurality of input optical fibers and the plurality of output optical fibers to N adjacent nodes (N is a natural number), a wavelength-multiplexed optical signal inputted to one of the plurality of input ports is wavelength-routed to any of the plurality of output ports,
wherein: the OXC device comprises:
a plurality of input-side wavelength selective switches (WSS) individually connected to one of the plurality of input optical fibers; and
a plurality of output-side WSSs or a plurality of output-side couplers individually connected to one of the plurality of output optical fibers,
each of the plurality of input-side WSSs is connected to at least some of the plurality of output-side WSSs or the plurality of output-side couplers by one or more internal paths,
the plurality of input-side WSSs has a $1 \times N_{WSS}$ configuration having $N_{WSS}$ output ports, and
when, for one adjacent node j (j=1, 2 . . . , N) of the N adjacent nodes, the number of a fiber pair consisting of one of the input optical fibers and one of the output optical fibers connected to the OXC device is $N_{Pair,j}$ (j=1, 2 . . . , N) and the total of the number of the fiber pairs between (N−1) adjacent nodes and the OXC device except for the one adjacent node j is $N_{Total,j}$, the maximum value $N_{Max}$ of the $N_{Total,j}$ satisfies the relation of $N_{Max} > N_{WSS}$ for the respective N adjacent nodes, and
wherein the optical cross-connect device further comprises a controller to output a signal depending on the usage status of the output optical fiber.

13. The optical cross-connect device according to claim 12, wherein: the signal is outputted based on a ration as the usage status comprising:
a ratio between the maximum frequency band that can be allocated to a target optical fiber and the total sum of the bands of the currently-used light paths; or
a ratio between the number of the light paths that can be stored in the target optical fiber and the number of the currently-used light paths.

14. The optical cross-connect device according to claim 13, wherein: the signal is outputted when the ratio is equal to or lower than a predetermined threshold value or within a predetermined range of threshold values.

15. An operation method of an optical cross-connect (OXC) device, the optical cross-connect (OXC) device comprising:
a plurality of input ports connected to a plurality of input optical fibers and a plurality of output ports connected to a plurality of output optical fibers, the OXC device is mutually connected via the plurality of input optical fibers and the plurality of output optical fibers to N adjacent nodes (N is a natural number), a wavelength-multiplexed optical signal inputted to one of the plurality of input ports is wavelength-routed to any of the plurality of output ports,
wherein the OXC device comprises:
a plurality of input-side wavelength selective switches (WSS) individually connected to one of the plurality of input optical fibers; and
a plurality of output-side WSSs or a plurality of output-side couplers individually connected to one of the plurality of output optical fibers,
wherein:
in an initial operation status, each of the plurality of input-side WSSs is connected to at least some of the plurality of output-side WSSs or the plurality of output-side couplers by one or more internal paths, and
at an increase of the number of the plurality output optical fibers, an output-side WSS or an output-side coupler connected to the one of the plurality of output optical fibers as an increase target is connected, based on the usage statuses of the input optical fibers, to at least some of the plurality of input-side WSSs by an internal path.

16. The operation method of an optical cross-connect device according to claim 15, wherein:
the plurality of input-side WSSs has a $1 \times N_{WSS}$ configuration having $N_{WSS}$ output ports,
when, for one adjacent node j (j=1, 2 . . . , N) of the N adjacent nodes, the number of a fiber pair consisting of one of the input optical fibers and one of the output optical fibers connected to the OXC device is $N_{Pair,j}$ (j=1, 2 . . . , N) and the total of the number of the fiber pairs between (N−1) adjacent nodes and the OXC device except for the one adjacent node j is $N_{Total,j}$, the maximum value $N_{Max}$ of the $N_{Total,j}$ satisfies the relation of $N_{Max}>N_{WSS}$ for the respective N adjacent nodes.

17. The operation method of an optical cross-connect device according to claim 15, wherein: the OXC device further comprises a controller to output a signal depending on the usage statuses of the input optical fibers.

18. The operation method of an optical cross-connect device according to claim 17, wherein:
the signal is outputted based on a ratio as the usage status comprising:
a ratio between the maximum frequency band that can be allocated to a target optical fiber and the total sum of the bands of the currently-used light paths, or
a ratio between the number of the light paths that can be stored in the target optical fiber and the number of the currently-used light paths.

19. The operation method of an optical cross-connect device according to claim 18, wherein: the signal is outputted when the ratio is equal to or lower than a predetermined threshold value or within a predetermined range of threshold values.

20. An operation method of an optical cross-connect (OXC) device, the optical cross-connect (OXC) device comprising:
a plurality of input ports connected to a plurality of input optical fibers and a plurality of output ports connected to a plurality of output optical fibers, the OXC device is mutually connected via the plurality of input optical fibers and the plurality of output optical fibers to N adjacent nodes (N is a natural number), a wavelength-multiplexed optical signal inputted to one of the plurality of input ports is wavelength-routed to any of the plurality of output ports,
wherein the OXC device comprises:
a plurality of input-side wavelength selective switches (WSS) individually connected to one of the plurality of input optical fibers; and
a plurality of output-side WSSs or a plurality of output-side couplers individually connected to one of the plurality of output optical fibers,
wherein:
in an initial operation status, each the plurality of input-side WSSs is connected to at least some of the plurality of output-side WSSs or the plurality of output-side couplers by one or more internal paths, and
at an increase of the number of the plurality of input optical fibers, an input-side WSS connected to the one of the plurality of output optical fibers as an increase target is connected, based on the usage statuses of the output optical fibers, to at least some of the plurality of output-side WSSs or the plurality of output-side couplers by an internal path.

21. The operation method of an optical cross-connect device according to claim 20, wherein:
the plurality of input-side WSSs have a $1 \times N_{WSS}$ configuration having $N_{WSS}$ output ports,
when, for one adjacent node j (j=1, 2 . . . , N) of the N adjacent nodes, the number of a fiber pair consisting of one of the input optical fibers and one of the output optical fibers connected to the OXC device is $N_{Pair,j}$ (j=1, 2 . . . , N) and the total of the number of the fiber pairs between (N−1) adjacent nodes and the OXC device except for the one adjacent node j is $N_{Total,j}$, the maximum value $N_{Max}$ of the $N_{Total,j}$ satisfies the relation of $N_{Max}>N_{WSS}$ for the respective N adjacent nodes.

22. The operation method of an optical cross-connect device according to claim 20, wherein: the OXC device further comprises a controller to output a signal depending on the usage status of the output optical fiber.

23. The operation method of an optical cross-connect device according to claim 22, wherein:
the signal is outputted based on a ratio as the usage status comprising:
a ratio between the maximum frequency band that can be allocated to a target optical fiber and the total sum of the bands of the currently-used light paths, or
a ratio between the number of the light paths that can be stored in the target optical fiber and the number of the currently-used light paths.

24. The operation method of an optical cross-connect device according to claim 23, wherein: the signal is outputted when the ratio is equal to or lower than a predetermined threshold value or within a predetermined range of threshold values.

25. An operation method of an optical cross-connect (OXC) device, the optical cross-connect (OXC) device comprising:

a plurality of input ports connected to a plurality of input optical fibers and a plurality of output ports connected to a plurality of output optical fibers, the OXC device is mutually connected via the plurality of input optical fibers and the plurality of output optical fibers to N adjacent nodes (N is a natural number), a wavelength-multiplexed optical signal inputted to one of the plurality of input ports is wavelength-routed to any of the plurality of output ports, wherein the OXC device comprises:

a plurality of input-side couplers individually connected to one of the plurality of input optical fibers; and a plurality of output-side wavelength selective switches (WSS) individually connected to one of the plurality of output optical fibers, wherein:

in an initial operation status, each of the plurality of input-side couplers is connected to at least some of the plurality of output-side WSSs by one or more internal paths, respectively, and at an increase of the number of the plurality of output optical fibers, an output-side WSS connected to the one of the plurality of output optical fibers as an increase target is connected, based on the usage statuses of the input optical fibers, to at least some of the plurality of input-side couplers.

26. The operation method according to claim 25, wherein: the plurality of output-side WSSs have a 1×$N_{WSS}$ configuration having $N_{WSS}$ output ports, and when, for one adjacent node j (j=1, 2 . . . , N) of the N adjacent nodes, the number of a fiber pair consisting of one of the input optical fibers and one of the output optical fibers connected to the OXC device is $N_{Pair,j}$ (j=1, 2 . . . , N) and the total of the number of the fiber pairs between (N−1) adjacent nodes and the OXC device except for the one adjacent node j is $N_{Total,j}$, the maximum value $N_{Max}$ of the $N_{Total,j}$ satisfies the relation of $N_{Max}$>$N_{WSS}$ for the respective N adjacent nodes.

27. The operation method of an optical cross-connect device according to claim 25, wherein: the OXC device further comprises a controller to output a signal depending on the usage statuses of the input optical fibers.

28. The operation method of an optical cross-connect device according to claim 27, wherein:

the signal is outputted based on a ratio as the usage status comprising:

a ratio between the maximum frequency band that can be allocated to a target optical fiber and the total sum of the bands of the currently-used light paths, or a ratio between the number of the light paths that can be stored in the target optical fiber and the number of the currently-used light paths.

29. The operation method of an optical cross-connect device according to claim 28, wherein: the signal is outputted when the ratio is equal to or lower than a predetermined threshold value or within a predetermined range of threshold values.

30. An operation method of an optical cross-connect (OXC) device, the optical cross-connect (OXC) device comprising:

a plurality of input ports connected to a plurality of input optical fibers and a plurality of output ports connected to a plurality of output optical fibers, the OXC device is mutually connected via the plurality of input optical fibers and the plurality of output optical fibers to N adjacent nodes (N is a natural number), a wavelength-multiplexed optical signal inputted to one of the plurality of input ports is wavelength-routed to any of the plurality of output ports, wherein the OXC device comprises:

a plurality of input-side couplers individually connected to one of the plurality of input optical fibers; and a plurality of output-side wavelength selective switches (WSS) individually connected to one of the plurality of output optical fibers, wherein:

in an initial operation status, each of the plurality of input-side couplers is connected to at least some of the plurality of output-side WSSs by one or more internal paths, respectively, and at an increase of the number of the plurality of input optical fibers, an input-side coupler connected to the one of the plurality of output optical fibers is connected, based on the usage status of the output optical fiber, at least some of the plurality of output-side WSSs by an internal path.

31. The operation method according to claim 30, wherein: the plurality of output-side WSSs have a 1×$N_{WSS}$ configuration having $N_{WSS}$ output ports, and when, for one adjacent node j (j=1, 2 . . . , N) of the N adjacent nodes, the number of a fiber pair consisting of one of the input optical fibers and one of the output optical fibers connected to the OXC device is $N_{Pair,j}$ (j=1, 2 . . . , N) and the total of the number of the fiber pairs between (N−1) adjacent nodes and the OXC device except for the one adjacent node j is $N_{Total,j}$, the maximum value $N_{Max}$ of the $N_{Total,j}$ satisfies the relation of $N_{Max}$>$N_{WSS}$ for the respective N adjacent nodes.

32. The operation method of an optical cross-connect device according to claim 30, wherein: the OXC device further comprises a controller to output a signal depending on the usage status of the output optical fiber.

33. The operation method of an optical cross-connect device according to claim 32, wherein:

the signal is outputted based on a ratio as the usage status comprising:

a ratio between the maximum frequency band that can be allocated to a target optical fiber and the total sum of the bands of the currently-used light paths, or a ratio between the number of the light paths that can be stored in the target optical fiber and the number of the currently-used light paths.

34. The operation method of an optical cross-connect device according to claim 33, wherein: the signal is outputted when the ratio is equal to or lower than a predetermined threshold value or within a predetermined range of threshold values.

* * * * *